US012777469B2

(12) United States Patent
Ibrahim et al.

(10) Patent No.: US 12,777,469 B2
(45) Date of Patent: Oct. 27, 2026

(54) JOINT CONFIGURATION OF TIME AND FREQUENCY RESOURCES FOR FULL DUPLEX

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Qian Zhang, Basking Ridge, NJ (US); Yan Zhou, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1042 days.

(21) Appl. No.: 17/940,668

(22) Filed: Sep. 8, 2022

(65) Prior Publication Data

US 2024/0023072 A1 Jan. 18, 2024

Related U.S. Application Data

(60) Provisional application No. 63/390,275, filed on Jul. 18, 2022.

(51) Int. Cl.
*H04W 72/044* (2023.01)

(52) U.S. Cl.
CPC ................................ *H04W 72/044* (2013.01)

(58) Field of Classification Search
None
See application file for complete search history.

(56) References Cited

U.S. PATENT DOCUMENTS

| | | | | |
|---|---|---|---|---|
| 2020/0084009 | A1* | 3/2020 | Guan | H04W 72/23 |
| 2023/0180224 | A1* | 6/2023 | Rudolf | H04W 72/23 |
| 2023/0199730 | A1* | 6/2023 | Rudolf | H04L 1/0025 370/329 |
| 2023/0421222 | A1* | 12/2023 | Chatterjee | H04B 7/0626 |
| 2024/0023072 | A1* | 1/2024 | Ibrahim | H04L 5/0094 |
| 2024/0107525 | A1* | 3/2024 | Khan Beigi | H04L 5/1469 |
| 2024/0163192 | A1* | 5/2024 | Qin | H04L 45/741 |

* cited by examiner

*Primary Examiner* — Hassan A Phillips
*Assistant Examiner* — Gautam Sharma
(74) *Attorney, Agent, or Firm* — Holland & Hart LLP

(57) ABSTRACT

Methods, systems, and devices for wireless communications are described. A network entity may jointly configure a user equipment (UE) with time and frequency resources for full duplex communications. For instance, the network entity may provide a time resource pattern to the UE indicating a sequence of types of time resources, and the sequence of types may include a first type configuring resources for uplink and downlink communications in a first time resource. A configuration for the first type of the first time resource may indicate a first portion of frequency resources allocated for downlink communications and a second portion of frequency resources allocated for uplink communications. Thus, the UE may receive downlink signals on the first portion of frequency resources in the first time resource, and the UE may transmit uplink signals on the second portion of frequency resources in the first time resource.

28 Claims, 22 Drawing Sheets

200-a 200-b

JOINT CONFIGURATION OF TIME AND FREQUENCY RESOURCES FOR FULL DUPLEX

CROSS REFERENCE

The present Application for Patent claims the benefit of U.S. Provisional Patent Application No. 63/390,275 by IBRAHIM et al., entitled "JOINT CONFIGURATION OF TIME AND FREQUENCY RESOURCES FOR FULL DUPLEX," filed Jul. 18, 2022, assigned to the assignee hereof, and expressly incorporated by reference herein.

FIELD OF TECHNOLOGY

The following relates to wireless communications, including joint configuration of time and frequency resources for full duplex.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

SUMMARY

The described techniques relate to improved methods, systems, devices, and apparatuses that support joint configuration of time and frequency resources for full duplex. A network entity may jointly configure a user equipment (UE) with time and frequency resources for full duplex communications. For instance, the network entity may provide a time resource pattern to the UE indicating a sequence of types of time resources, and the sequence of types may configure resources for uplink and downlink communications in a first time resource. A given type may be one of a set of types of time resources defined for full duplex communications. A configuration for the given type of the first time resource may indicate a first portion of frequency resources allocated for downlink communications and a second portion of frequency resources allocated for uplink communications. The UE may receive downlink signals on the first portion of frequency resources in the first time resource, and the UE may transmit uplink signals on the second portion of frequency resources in the first time resource.

A method for wireless communication at a UE is described. The method may include receiving, from a network entity, an indication of a time resource pattern including a sequence of types of a set of multiple time resources, the sequence of types including a first type of a first time resource of the set of multiple time resources, the first type indicating a split of a set of multiple frequency resources in the first time resource into a set of multiple portions of frequency resources, the set of multiple portions of frequency resources including a first portion of frequency resources allocated for downlink and a second portion of frequency resources allocated for uplink, receiving downlink signals from the network entity on the first portion of frequency resources in the first time resource, and transmitting uplink signals to the network entity on the second portion of frequency resources in the first time resource.

An apparatus for wireless communication at a UE is described. The apparatus may include a processor, memory coupled with the processor, and instructions stored in the memory. The instructions may be executable by the processor to cause the apparatus to receive, from a network entity, an indication of a time resource pattern including a sequence of types of a set of multiple time resources, the sequence of types including a first type of a first time resource of the set of multiple time resources, the first type indicating a split of a set of multiple frequency resources in the first time resource into a set of multiple portions of frequency resources, the set of multiple portions of frequency resources including a first portion of frequency resources allocated for downlink and a second portion of frequency resources allocated for uplink, receive downlink signals from the network entity on the first portion of frequency resources in the first time resource, and transmit uplink signals to the network entity on the second portion of frequency resources in the first time resource.

Another apparatus for wireless communication at a UE is described. The apparatus may include means for receiving, from a network entity, an indication of a time resource pattern including a sequence of types of a set of multiple time resources, the sequence of types including a first type of a first time resource of the set of multiple time resources, the first type indicating a split of a set of multiple frequency resources in the first time resource into a set of multiple portions of frequency resources, the set of multiple portions of frequency resources including a first portion of frequency resources allocated for downlink and a second portion of frequency resources allocated for uplink, means for receiving downlink signals from the network entity on the first portion of frequency resources in the first time resource, and means for transmitting uplink signals to the network entity on the second portion of frequency resources in the first time resource.

A non-transitory computer-readable medium storing code for wireless communication at a UE is described. The code may include instructions executable by a processor to receive, from a network entity, an indication of a time resource pattern including a sequence of types of a set of multiple time resources, the sequence of types including a first type of a first time resource of the set of multiple time resources, the first type indicating a split of a set of multiple frequency resources in the first time resource into a set of multiple portions of frequency resources, the set of multiple portions of frequency resources including a first portion of frequency resources allocated for downlink and a second portion of frequency resources allocated for uplink, receive downlink signals from the network entity on the first portion of frequency resources in the first time resource, and transmit uplink signals to the network entity on the second portion of frequency resources in the first time resource.

Some examples of the method, apparatuses, and non-transitory computer-readable medium described herein may further include operations, features, means, or instructions for receiving an indication of a configuration for the first type of the first time resource, the configuration for the first type including an identifier of the first type, the split of frequency resources in the first time resource, and an indication of frequency resources in each portion of the set of multiple portions of frequency resources in the first time resource.

Some examples of the method, apparatuses, and non-transitory computer-readable medium described herein may further include operations, features, means, or instructions for receiving an indication of a first range of frequency resources in the first portion of frequency resources and a second range of frequency resources in the second portion of frequency resources, where a guard band separating the first portion of frequency resources from the second portion of frequency resources may be identified based on the first range of frequency resources in the first portion of frequency resources and the second range of frequency resources in the second portion of frequency resources.

Some examples of the method, apparatuses, and non-transitory computer-readable medium described herein may further include operations, features, means, or instructions for receiving, for each of the first range of frequency resources and the second range of frequency resources, a starting frequency resource and an ending frequency resource of each range, a starting frequency resource and a length of each range, an ending frequency resource of each range, or a length of each range.

Some examples of the method, apparatuses, and non-transitory computer-readable medium described herein may further include operations, features, means, or instructions for receiving an indication of a first range of frequency resources in the first portion of frequency resources, a second range of frequency resources in the second portion of frequency resources, a third range of frequency resources including a first guard band adjacent to the first portion of frequency resources, and a fourth range of frequency resources including a second guard band adjacent to the second portion of frequency resources, where a third portion of frequency resources between the first guard band and the second guard band may be identified based on the third range of frequency resources including the first guard band and the fourth range of frequency resources including the second guard band.

Some examples of the method, apparatuses, and non-transitory computer-readable medium described herein may further include operations, features, means, or instructions for receiving, for each of the first range of frequency resources, the second range of frequency resources, the third range of frequency resources, and the fourth range of frequency resources, a starting frequency resource and an ending frequency resource of each range, a starting frequency resource and a length of each range, an ending frequency resource of each range, or a length of each range.

Some examples of the method, apparatuses, and non-transitory computer-readable medium described herein may further include operations, features, means, or instructions for receiving an indication of a first range of frequency resources in the first portion of frequency resources and a second range of frequency resources including a guard band adjacent to the first portion of frequency resources, where the second portion of frequency resources may be adjacent to the guard band and may be identified based on the second range of frequency resources including the guard band.

Some examples of the method, apparatuses, and non-transitory computer-readable medium described herein may further include operations, features, means, or instructions for receiving, for each of the first range of frequency resources and the second range of frequency resources, a starting frequency resource and an ending frequency resource of each range, a starting frequency resource and a length of each range, an ending frequency resource of each range, or a length of each range.

In some examples of the method, apparatuses, and non-transitory computer-readable medium described herein, receiving the indication of the time resource pattern may include operations, features, means, or instructions for receiving an indication of a respective identifier of each type of the sequence of types in the time resource pattern.

In some examples of the method, apparatuses, and non-transitory computer-readable medium described herein, receiving the indication of the time resource pattern may include operations, features, means, or instructions for receiving an indication of identifiers of distinct types of the sequence of types in the time resource pattern and a respective quantity of time resources having each of the distinct types in the set of multiple time resources.

In some examples of the method, apparatuses, and non-transitory computer-readable medium described herein, each type of the sequence of types in the time resource pattern may be selected from one or more types, and the time resource pattern may be selected from one or more time resource patterns.

Some examples of the method, apparatuses, and non-transitory computer-readable medium described herein may further include operations, features, means, or instructions for receiving an indication of the one or more types from which each type of the sequence of types in the time resource pattern may be selected, an indication of the one or more time resource patterns from which the time resource pattern may be selected, or both.

Some examples of the method, apparatuses, and non-transitory computer-readable medium described herein may further include operations, features, means, or instructions for receiving an indication of a first configuration of each frequency resource of the set of multiple frequency resources in the first time resource for uplink, downlink, or as a guard band, the first configuration allocating the first portion of frequency resources for downlink and the second portion of frequency resources for uplink.

In some examples of the method, apparatuses, and non-transitory computer-readable medium described herein, the first configuration may be selected from one or more configurations of each frequency resource of the set of multiple frequency resources in the first time resource for uplink, downlink, or as a guard band.

Some examples of the method, apparatuses, and non-transitory computer-readable medium described herein may further include operations, features, means, or instructions for receiving an indication of the one or more configurations of each frequency resource of the set of multiple frequency resources in the first time resource for uplink, downlink, or as a guard band.

In some examples of the method, apparatuses, and non-transitory computer-readable medium described herein, the time resources include slots, symbols, or a group of symbols, and the frequency resources include resource blocks, resource block groups, subbands, or a group of subcarriers.

A method for wireless communication at a network entity is described. The method may include transmitting, to a UE, an indication of a time resource pattern including a sequence of types of a set of multiple time resources, the sequence of types including a first type of a first time resource of the set of multiple time resources, the first type indicating a split of a set of multiple frequency resources in the first time resource into a set of multiple portions of frequency resources, the set of multiple portions of frequency resources including a first portion of frequency resources allocated for downlink and a second portion of frequency resources allocated for uplink, transmitting downlink signals to the UE on the first portion of frequency resources in the first time resource, and receiving uplink signals from the UE on the second portion of frequency resources in the first time resource.

An apparatus for wireless communication at a network entity is described. The apparatus may include a processor, memory coupled with the processor, and instructions stored in the memory. The instructions may be executable by the processor to cause the apparatus to transmit, to a UE, an indication of a time resource pattern including a sequence of types of a set of multiple time resources, the sequence of types including a first type of a first time resource of the set of multiple time resources, the first type indicating a split of a set of multiple frequency resources in the first time resource into a set of multiple portions of frequency resources, the set of multiple portions of frequency resources including a first portion of frequency resources allocated for downlink and a second portion of frequency resources allocated for uplink, transmit downlink signals to the UE on the first portion of frequency resources in the first time resource, and receive uplink signals from the UE on the second portion of frequency resources in the first time resource.

Another apparatus for wireless communication at a network entity is described. The apparatus may include means for transmitting, to a UE, an indication of a time resource pattern including a sequence of types of a set of multiple time resources, the sequence of types including a first type of a first time resource of the set of multiple time resources, the first type indicating a split of a set of multiple frequency resources in the first time resource into a set of multiple portions of frequency resources, the set of multiple portions of frequency resources including a first portion of frequency resources allocated for downlink and a second portion of frequency resources allocated for uplink, means for transmitting downlink signals to the UE on the first portion of frequency resources in the first time resource, and means for receiving uplink signals from the UE on the second portion of frequency resources in the first time resource.

A non-transitory computer-readable medium storing code for wireless communication at a network entity is described. The code may include instructions executable by a processor to transmit, to a UE, an indication of a time resource pattern including a sequence of types of a set of multiple time resources, the sequence of types including a first type of a first time resource of the set of multiple time resources, the first type indicating a split of a set of multiple frequency resources in the first time resource into a set of multiple portions of frequency resources, the set of multiple portions of frequency resources including a first portion of frequency resources allocated for downlink and a second portion of frequency resources allocated for uplink, transmit downlink signals to the UE on the first portion of frequency resources in the first time resource, and receive uplink signals from the UE on the second portion of frequency resources in the first time resource.

Some examples of the method, apparatuses, and non-transitory computer-readable medium described herein may further include operations, features, means, or instructions for transmitting an indication of a configuration for the first type of the first time resource, the configuration for the first type including an identifier of the first type, the split of frequency resources in the first time resource, and an indication of frequency resources in each portion of the set of multiple portions of frequency resources in the first time resource.

Some examples of the method, apparatuses, and non-transitory computer-readable medium described herein may further include operations, features, means, or instructions for transmitting an indication of a first range of frequency resources in the first portion of frequency resources and a second range of frequency resources in the second portion of frequency resources, where a guard band separating the first portion of frequency resources from the second portion of frequency resources may be identified based on the first range of frequency resources in the first portion of frequency resources and the second range of frequency resources in the second portion of frequency resources.

Some examples of the method, apparatuses, and non-transitory computer-readable medium described herein may further include operations, features, means, or instructions for transmitting, for each of the first range of frequency resources and the second range of frequency resources, a starting frequency resource and an ending frequency resource of each range, a starting frequency resource and a length of each range, an ending frequency resource of each range, or a length of each range.

Some examples of the method, apparatuses, and non-transitory computer-readable medium described herein may further include operations, features, means, or instructions for transmitting an indication of a first range of frequency resources in the first portion of frequency resources, a second range of frequency resources in the second portion of frequency resources, a third range of frequency resources including a first guard band adjacent to the first portion of frequency resources, and a fourth range of frequency resources including a second guard band adjacent to the second portion of frequency resources, where a third portion of frequency resources between the first guard band and the second guard band may be identified based on the third range of frequency resources including the first guard band and the fourth range of frequency resources including the second guard band.

Some examples of the method, apparatuses, and non-transitory computer-readable medium described herein may further include operations, features, means, or instructions for transmitting, for each of the first range of frequency resources, the second range of frequency resources, the third range of frequency resources, and the fourth range of frequency resources, a starting frequency resource and an ending frequency resource of each range, a starting frequency resource and a length of each range, an ending frequency resource of each range, or a length of each range.

Some examples of the method, apparatuses, and non-transitory computer-readable medium described herein may further include operations, features, means, or instructions for transmitting an indication of a first range of frequency resources in the first portion of frequency resources and a second range of frequency resources including a guard band adjacent to the first portion of frequency resources, where the second portion of frequency resources may be adjacent to the guard band and may be identified based on the second range of frequency resources including the guard band.

Some examples of the method, apparatuses, and non-transitory computer-readable medium described herein may further include operations, features, means, or instructions for transmitting, for each of the first range of frequency resources and the second range of frequency resources, a starting frequency resource and an ending frequency resource of each range, a starting frequency resource and a length of each range, an ending frequency resource of each range, or a length of each range.

In some examples of the method, apparatuses, and non-transitory computer-readable medium described herein, transmitting the indication of the time resource pattern may include operations, features, means, or instructions for transmitting an indication of a respective identifier of each type of the sequence of types in the time resource pattern.

In some examples of the method, apparatuses, and non-transitory computer-readable medium described herein, transmitting the indication of the time resource pattern may include operations, features, means, or instructions for transmitting an indication of identifiers of distinct types of the sequence of types in the time resource pattern and a respective quantity of time resources having each of the distinct types in the set of multiple time resources.

In some examples of the method, apparatuses, and non-transitory computer-readable medium described herein, each type of the sequence of types in the time resource pattern may be selected from one or more types, and the time resource pattern may be selected from one or more time resource patterns.

Some examples of the method, apparatuses, and non-transitory computer-readable medium described herein may further include operations, features, means, or instructions for transmitting an indication of the one or more types from which each type of the sequence of types in the time resource pattern may be selected, an indication of the one or more time resource patterns from which the time resource pattern may be selected, or both.

Some examples of the method, apparatuses, and non-transitory computer-readable medium described herein may further include operations, features, means, or instructions for transmitting an indication of a first configuration of each frequency resource of the set of multiple frequency resources in the first time resource for uplink, downlink, or as a guard band, the first configuration allocating the first portion of frequency resources for downlink and the second portion of frequency resources for uplink.

In some examples of the method, apparatuses, and non-transitory computer-readable medium described herein, the first configuration may be selected from one or more configurations of each frequency resource of the set of multiple frequency resources in the first time resource for uplink, downlink, or as a guard band.

Some examples of the method, apparatuses, and non-transitory computer-readable medium described herein may further include operations, features, means, or instructions for transmitting an indication of the one or more configurations of each frequency resource of the set of multiple frequency resources in the first time resource for uplink, downlink, or as a guard band.

In some examples of the method, apparatuses, and non-transitory computer-readable medium described herein, the time resources include slots, symbols, or a group of symbols, and the frequency resources include resource blocks, resource block groups, subbands, or a group of subcarriers.

DETAILED DESCRIPTION

Figure 1:
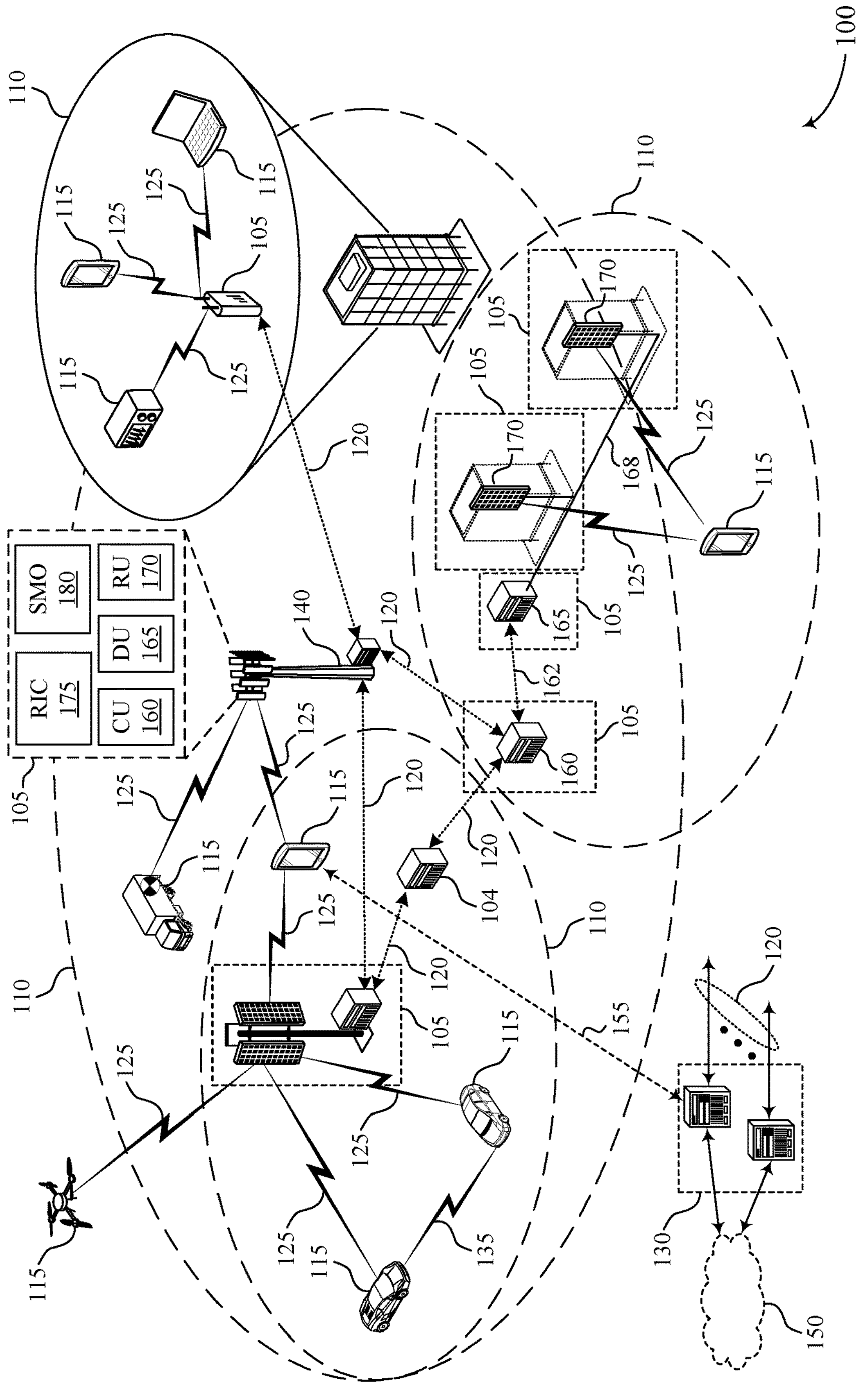
FIG. 1 illustrates an example of a wireless communications system that supports joint configuration of time and frequency resources for full duplex in accordance with one or more aspects of the present disclosure.

Some wireless communications systems may support techniques for configuring time resources for uplink communications or downlink communications between a network entity and a user equipment (UE). For instance, a network entity may signal a time resource pattern to a UE indicating a sequence of types of time resources for communications between the network entity and the UE. A type of a time resource may be uplink, downlink, or flexible and may indicate whether the time resource is configured for uplink, downlink, or flexible communications, respectively. Thus, after receiving a time resource pattern and an allocation of resources, a UE may determine whether to transmit uplink signals or receive downlink signals on each time resource of the allocated resources according to the time resource pattern.

In some aspects, a UE may support full duplex communications with a network entity and may be capable of simultaneously or concurrently transmitting uplink signals and receiving downlink signals. In such cases, it may be appropriate for the UE to be configured with one or more time resources for simultaneous uplink and downlink communications. However, techniques for configuring a UE with a time resource for simultaneous uplink and downlink communications (e.g., full duplex communications) may be undefined or underdeveloped. For instance, a time resource pattern configuring time resources for either uplink, downlink, or flexible communications may not facilitate full duplex communications. As a result, a UE may not be able to take advantage of full duplex communications, and the UE may experience reduced throughput and increased latency.

As described herein, a wireless communications system may support efficient techniques for configuring time and frequency resources for full duplex communications. A network entity may jointly configure a UE with time and frequency resources for full duplex communications. For instance, the network entity may provide a time resource pattern to the UE indicating a sequence of types of time resources, and the sequence of types may include a given type configuring resources for uplink and downlink communications in a first time resource. The given type may be one of one or more types of time resources defined for full duplex communications. A configuration for the given type of the first time resource may indicate a first portion of frequency resources allocated for downlink communications and a second portion of frequency resources allocated for uplink communications. The UE may receive downlink signals on the first portion of frequency resources in the first time resource, and the UE may transmit uplink signals on the second portion of frequency resources in the first time resource.

Aspects of the disclosure are initially described in the context of wireless communications systems, full duplex operations, a time resource pattern, resource configurations, and a process flow. Aspects of the disclosure are further illustrated by and described with reference to apparatus diagrams, system diagrams, and flowcharts that relate to joint configuration of time and frequency resources for full duplex.

FIG. 1 illustrates an example of a wireless communications system 100 that supports joint configuration of time and frequency resources for full duplex in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support joint configuration of time and frequency resources for full duplex as described herein. For example, some operations described as being performed by a UE 115 or a network entity 105 (e.g., a base station 140)

may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of short TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

Some UEs 115 or network entities 105 in wireless communications system 100 may be configured to employ operating modes that reduce power consumption, such as half duplex communications (e.g., a mode that supports one-way communication via transmission or reception, but not transmission and reception concurrently). In some examples, half duplex communications may be performed at a reduced peak rate. Other power conservation techniques for the network entities 105 or UEs 115 include entering a power saving deep sleep mode when not engaging in active communications, operating over a limited bandwidth (e.g., according to narrowband communications), or a combination of these techniques. For example, some network entities 105 or UEs 115 may be configured for operation using a narrowband protocol type that is associated with a defined portion or range (e.g., a set of subcarriers or resource blocks (RBs)) within a carrier, within a guard-band of a carrier, or outside of a carrier.

In addition to, or as an alternative to, a half duplex mode, some network entities 105 or UEs 115 may support a full duplex mode. A full duplex mode may refer to a mode that supports two-way communications via simultaneous transmission and reception (e.g., in the same or overlapping frequency ranges). Two-way communications may be referred to as full duplex communications. Full duplex communications is a technique which is capable of theoretically doubling link capacity by enabling radio network nodes to transmit and receive simultaneously on the same time resource. Full duplex breaks half duplex operation constraints where transmission and reception differ in time. A full duplex network node, such as a network entity 105, UE 115, or both in the cellular network, can communicate simultaneously in uplink and downlink with two half duplex panels using the same radio resources. For instance, a UE 115 may transmit uplink transmissions from one panel at the UE 115, and the UE 115 may receive downlink transmissions at another panel at the UE 115. Similarly, a network entity 105 may receive uplink transmissions at one panel at the network entity 105, and the network entity 105 may transmit downlink transmissions from another panel at the network entity 105.

Thus, a device equipped with multiple TRPs that supports the capability of simultaneous transmission and reception using the same time radio resource (e.g., uplink or downlink transmissions in frequency range 2 (FR2) and different associated aspects of procedures) may be referred to as a full duplex capable device (e.g., full duplex UE 115 or full duplex network entity 105). The device may also be capable of working in both the full duplex mode and backing off to a half duplex mode. In some cases, a full duplex capability may be conditional on beam separation and other factors (e.g., self-interference between downlink and uplink and clutter echo at a device). However, full duplex communications may provide for latency reduction (e.g., since it may be possible to receive a downlink signal in an uplink-only slot, which may enable latency savings), spectrum efficiency enhancement (e.g., per cell or per UE 115), more efficient resource utilization, and coverage enhancements with continuous uplink or downlink transmissions or repetitions.

The wireless communications system 100 may support techniques for configuring time resources for uplink communications or downlink communications between a network entity 105 and a UE 115. For instance, a network entity 105 may transmit a time resource pattern to a UE 115 indicating a sequence of types of time resources for communications between the network entity 105 and the UE 115. A type of a time resource may be uplink, downlink, or flexible and may indicate whether the time resource is configured for uplink, downlink, or flexible communications, respectively. Thus, after receiving a time resource pattern and an allocation of resources, a UE 115 may be able to determine whether to transmit uplink signals or receive downlink signals on each time resource of the allocated resources.

The wireless communications system 100 may support efficient techniques for configuring time and frequency resources for full duplex communications. A network entity 105 may jointly configure a UE 115 with time and frequency resources for full duplex communications. For instance, the network entity 105 may provide a time resource pattern to the UE 115 indicating a sequence of types of time resources, and the sequence of types may include a first type configuring resources for uplink and downlink communications in a first time resource. The first type may be one of one or more types of time resources defined for full duplex communications. A configuration for the first type of the first time resource may indicate a first portion of frequency resources allocated for downlink communications and a second portion of frequency resources allocated for uplink communications. Thus, the UE 115 may receive downlink signals on the first portion of frequency resources in the first time resource, and the UE 115 may transmit uplink signals on the second portion of frequency resources in the first time resource.

Figure 2:
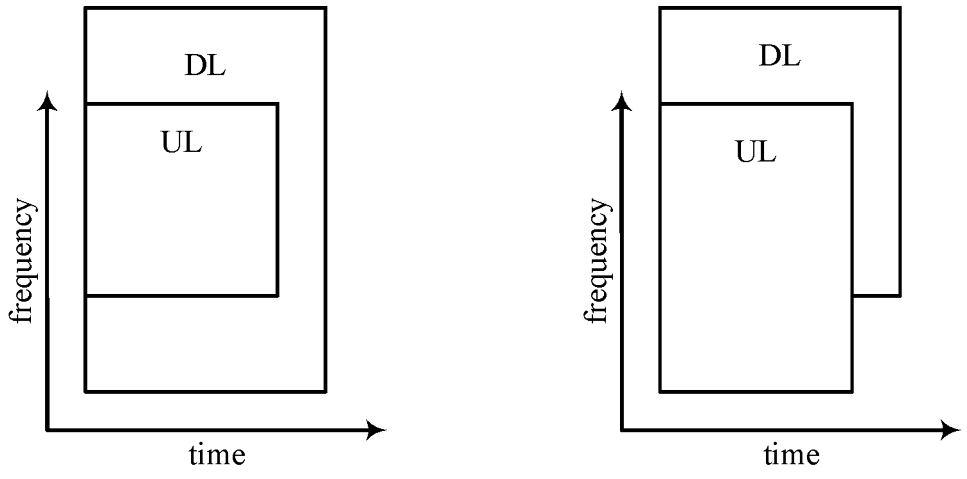
FIG. 2 illustrates an example of different types of full duplex operations in accordance with one or more aspects of the present disclosure.
Figure 2:
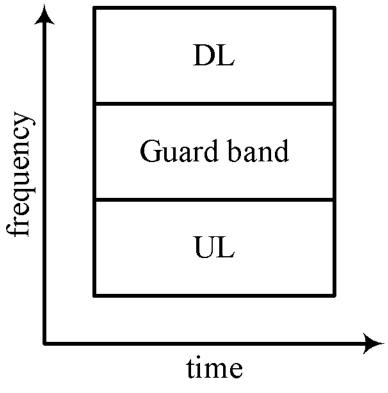

FIG. 2 illustrates an example of different types of full duplex operations in accordance with one or more aspects of the present disclosure. The first type of full duplex operation 200-*a* may be referred to as in-band full duplex (IBFD) operation. When supporting the first type of full duplex operation 200-*a*, a UE 115 or a network entity 105 may transmit and receive on the same time and frequency resource. For instance, downlink and uplink may share the same IBFD time or frequency resource (e.g., with full or partial overlapping between the downlink and the uplink). A second type of full duplex operation 200-*b* may be referred to as sub-band frequency division duplexing (FDD) operation, sub-band full duplex (SBFD) or flexible duplex operation. When supporting the second type of full duplex operation 200-*b*, a UE 115 or a network entity 105 may transmit and receive at the same time but on different frequency resources. In some cases, a downlink resource may be separated from an uplink resource in a frequency domain (e.g., by a guard band).

Figure 3:
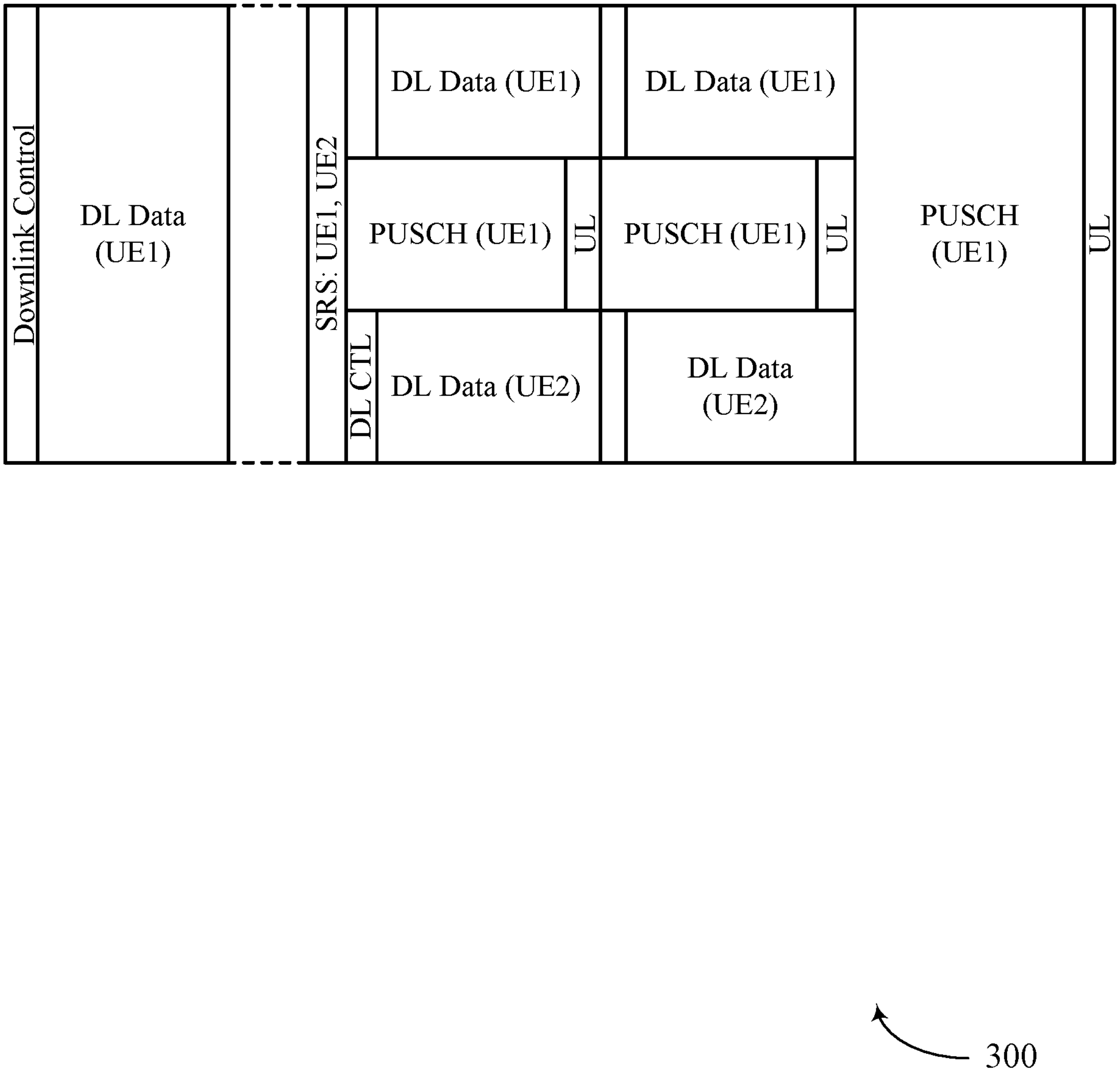
FIG. 3 illustrates an example of a subband full duplex (SBFD) slot format in accordance with one or more aspects of the present disclosure.

FIG. 3 illustrates an example of an SBFD slot format 300 in accordance with one or more aspects of the present disclosure. The SBFD slot format may be defined as a 'D+U' slot, which may be a slot in which a band is used for both uplink and downlink transmissions. The downlink and uplink transmissions may occur in overlapping bands (e.g., IBFD) or adjacent bands (e.g., SBFD). In a given 'D+U' symbol, a half duplex UE 115 either transmits in an uplink band or receives in a downlink band. In a given 'D+U' symbol, a full duplex UE 115 can transmit in an uplink band and/or receive in a downlink band. A 'D+U' slot may contain only downlink symbols, only uplink symbols, or full duplex symbols (e.g., symbols supporting both uplink and downlink communications).

Figure 4:
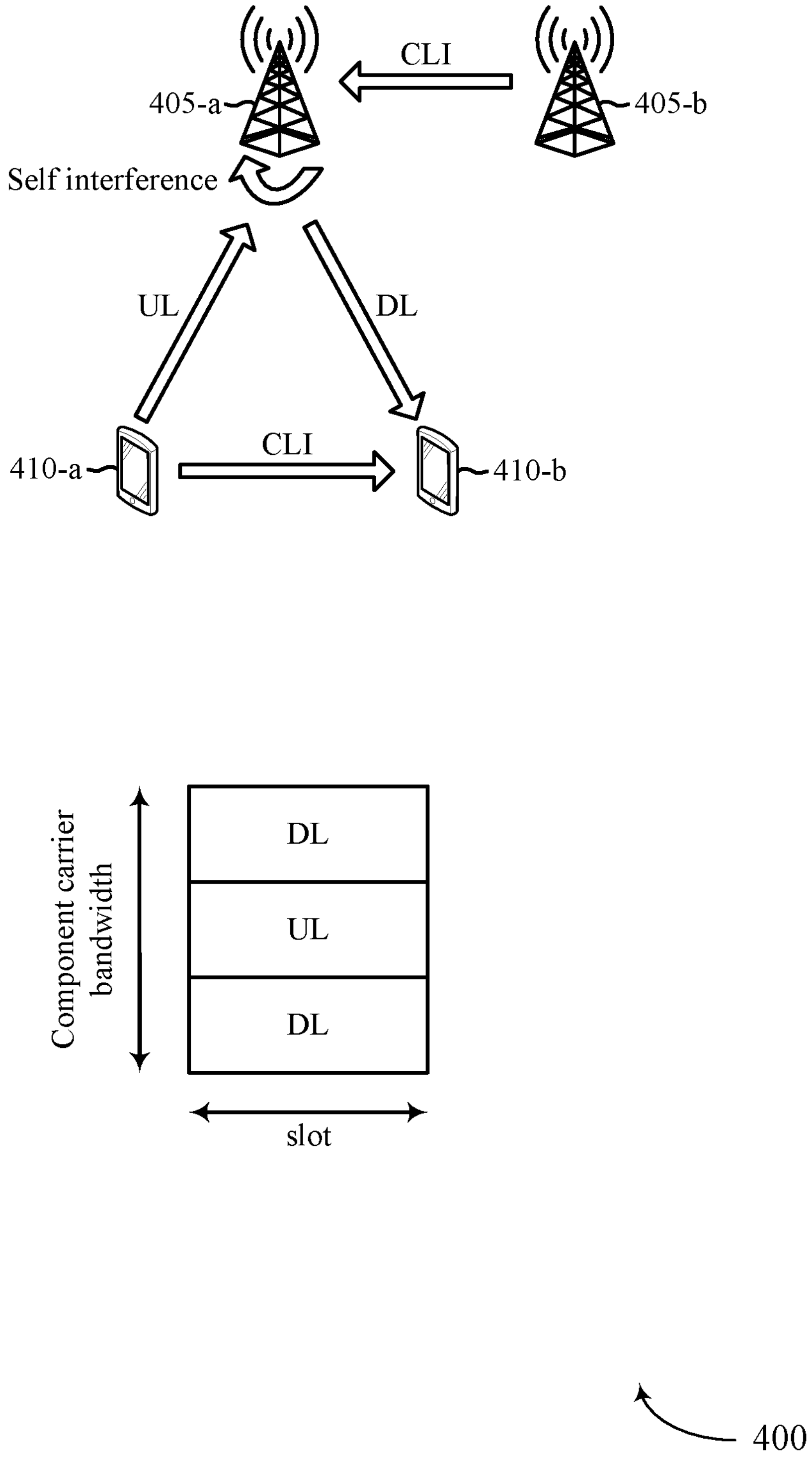
FIG. 4 illustrates an example of full duplex operation at a first network entity accordance with one or more aspects of the present disclosure.

FIG. 4 illustrates an example of full duplex operation 400 at a first network entity 405-*a* in accordance with one or more aspects of the present disclosure. The first network entity 405-*a* may communicate with a first UE 410-*a* and a second UE 410-*b* on non-overlapping uplink and downlink subbands (e.g., SBFD). The first network entity 405-*a* may receive uplink transmissions from the first UE 410-*a* and transmit downlink transmissions to the second UE 410-*b*. The second UE 410-*b* may experience cross link interference (CLI) from the uplink transmissions from the first UE 410-*a*, and the first network entity 405-*a* may experience CLI from a second network entity 405-*b*. The first network entity 405-*a* may also experience self-interference from full duplex operation since the first network entity 405-*a* may simultaneously or concurrently receive uplink transmissions from the first UE 410-*a* and transmit downlink transmissions to the second UE 410-*b* such that the uplink transmission and the downlink transmissions at least partially overlap in time.

Figure 5:
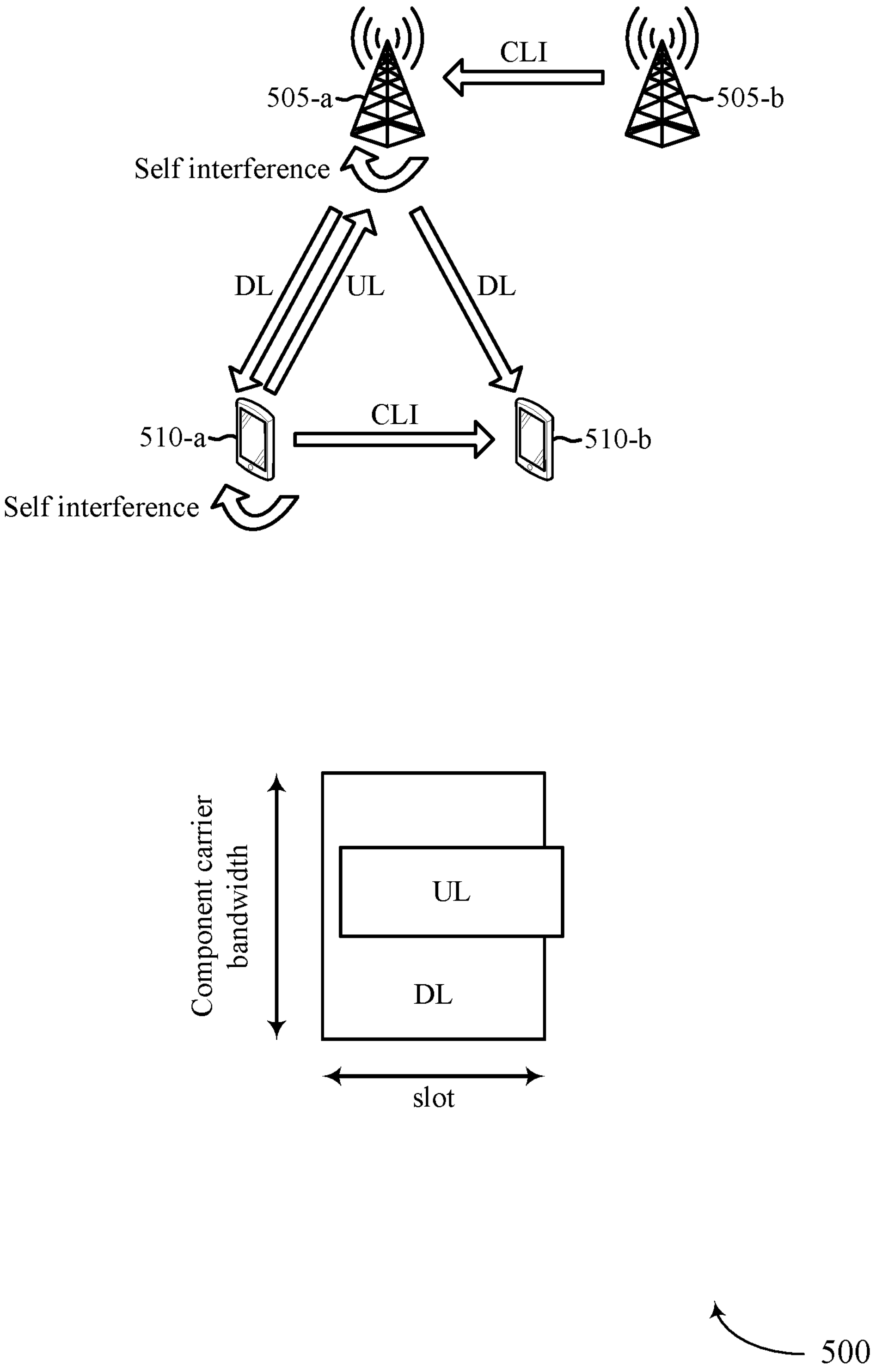
FIG. 5 illustrates an example of full duplex operation at a first network entity and a first user equipment (UE) in accordance with one or more aspects of the present disclosure.

FIG. 5 illustrates an example of full duplex operation 500 at a first network entity 505-*a* and a first UE 510-*a* in accordance with one or more aspects of the present disclosure. The first network entity 505-*a* may communicate with the first UE 510-*a* and the second UE 510-*b* on partially overlapping uplink and downlink subbands. A second UE 510-*b* may experience CLI from the uplink transmissions from the first UE 510-*a*, and the first network entity 505-*a* may experience CLI from a second network entity 505-*b*. The first network entity 505-*a* may experience self-interference from full duplex operation since the first network entity 505-*a* may simultaneously receive uplink transmissions from the first UE 510-*a* and transmit downlink transmissions to the first UE 510-*a* and the second UE 510-*b*. The first UE 510-*a* may also experience self-interference from full duplex operation since the first UE 510-*a* may simultaneously receive downlink transmissions from the first network entity 505-*a* and transmit uplink transmissions to the first network entity 505-*a*.

Figure 6:
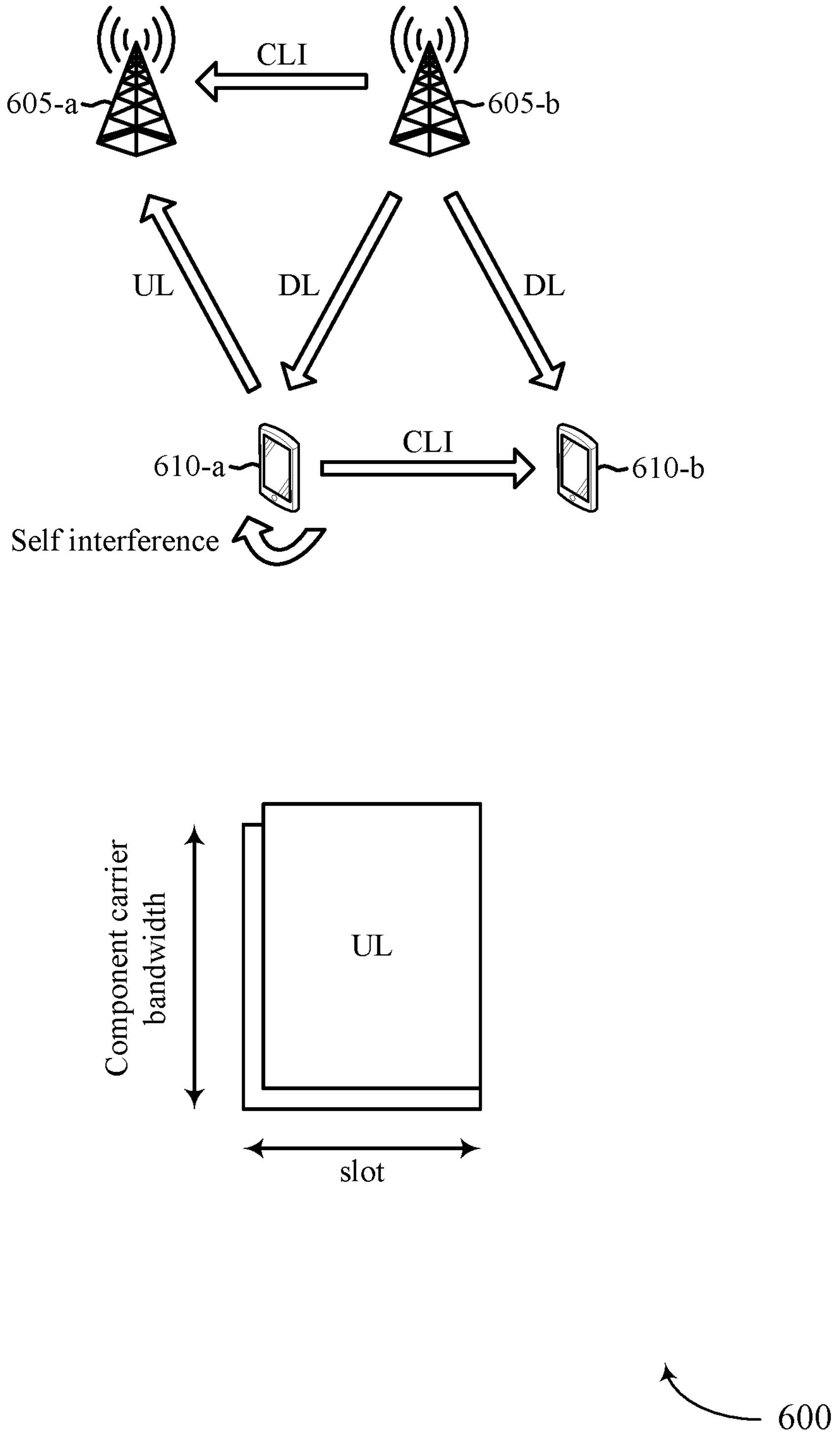
FIG. 6 illustrates an example of full duplex operation at a first UE in accordance with one or more aspects of the present disclosure.

FIG. 6 illustrates an example of full duplex operation 600 at a first UE 610-*a* in accordance with one or more aspects of the present disclosure. The first UE 610-*a* may be an SBFD UE 115 and may communicate with multiple TRPs on fully overlapping uplink and downlink subbands. A second UE 610-*b* may experience CLI from uplink transmissions from the first UE 610-*a*, and a first network entity 605-*a* may experience CLI from downlink transmissions from a second network entity 605-*b*. The first UE 610-*a* may experience self-interference from full duplex operation since the first UE 610-*a* may simultaneously transmit uplink transmissions to the first network entity 605-*a* and receive downlink transmissions from the second network entity 605-*b*.

Figure 7:
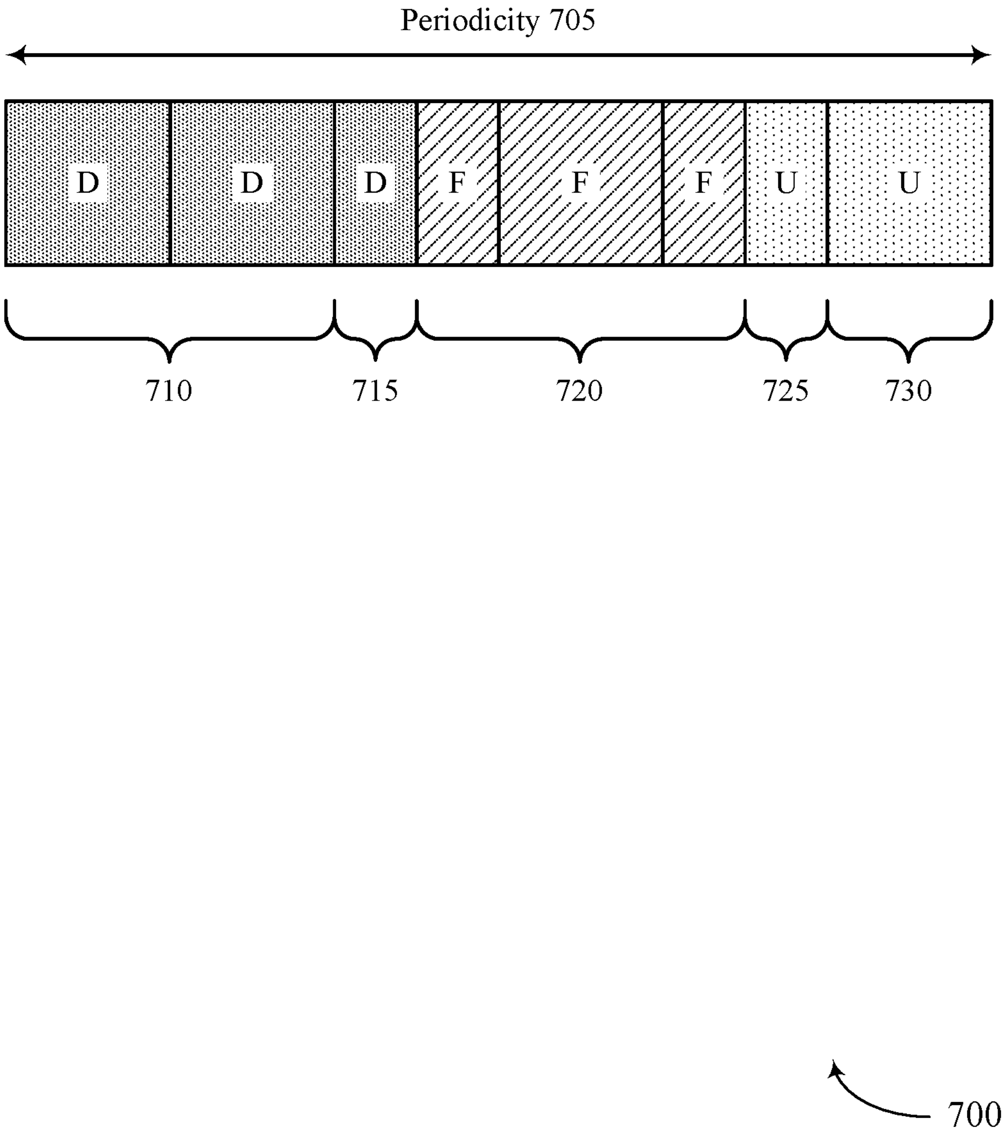
FIG. 7 illustrates an example of a time resource pattern in accordance with one or more aspects of the present disclosure.

FIG. 7 illustrates an example of a time resource pattern 700 in accordance with one or more aspects of the present disclosure. A network entity 105 may provide a semi-static slot format configuration (e.g., a time division duplexing (TDD) uplink or downlink common configuration) indicating the time resource pattern 700. In some examples, the time resource pattern 700 may be indicated using a TDD-UL-DL-Pattern information element (IE). The TDD-UL-DL-Pattern IE may indicate a periodicity 705, a quantity (e.g., number) of downlink slots 710 (e.g., at a beginning of the periodicity 705), a quantity of downlink symbols 715 (e.g., following the downlink slots 710), a quantity of uplink slots 730 (e.g., at an end of the periodicity 705), and a quantity of uplink symbols 725 (e.g., preceding the uplink slots 730). A quantity of flexible time resources 720 (e.g., slots or symbols) between the downlink time resources and the uplink time resources may be implicit.

The time resource pattern 700 described with reference to FIG. 7 may support communications between a network entity and a UE in a single link direction (e.g., downlink or uplink) in each time resource. In some aspects, however, a UE may support full duplex communications with a network entity and may be capable of simultaneously transmitting uplink signals and receiving downlink signals. In such aspects, it may be appropriate for the UE to be configured with one or more time resources supporting simultaneous uplink and downlink communications. Techniques for configuring a UE with a time resource for simultaneous uplink and downlink communications (e.g., full duplex communications) may be undefined or underdeveloped. As a result, a UE may not be able to take advantage of full duplex communications, and the UE may experience reduced throughput and increased latency.

The techniques described herein may allow for efficient configuration of time and frequency resources for full duplex communications. Using these techniques, a UE may be able to operate in a full duplex mode and take advantage of full duplex communications. Further, using these techniques, a UE that is aware of full duplex communications (e.g., an SBFD-aware UE operating in a half duplex mode while communicating with a full duplex network entity) may be able to determine a full duplex time resource pattern (e.g., SBFD slot pattern), and the UE may optimize transmission and reception operation when communicating with a full duplex network entity.

Figure 8:
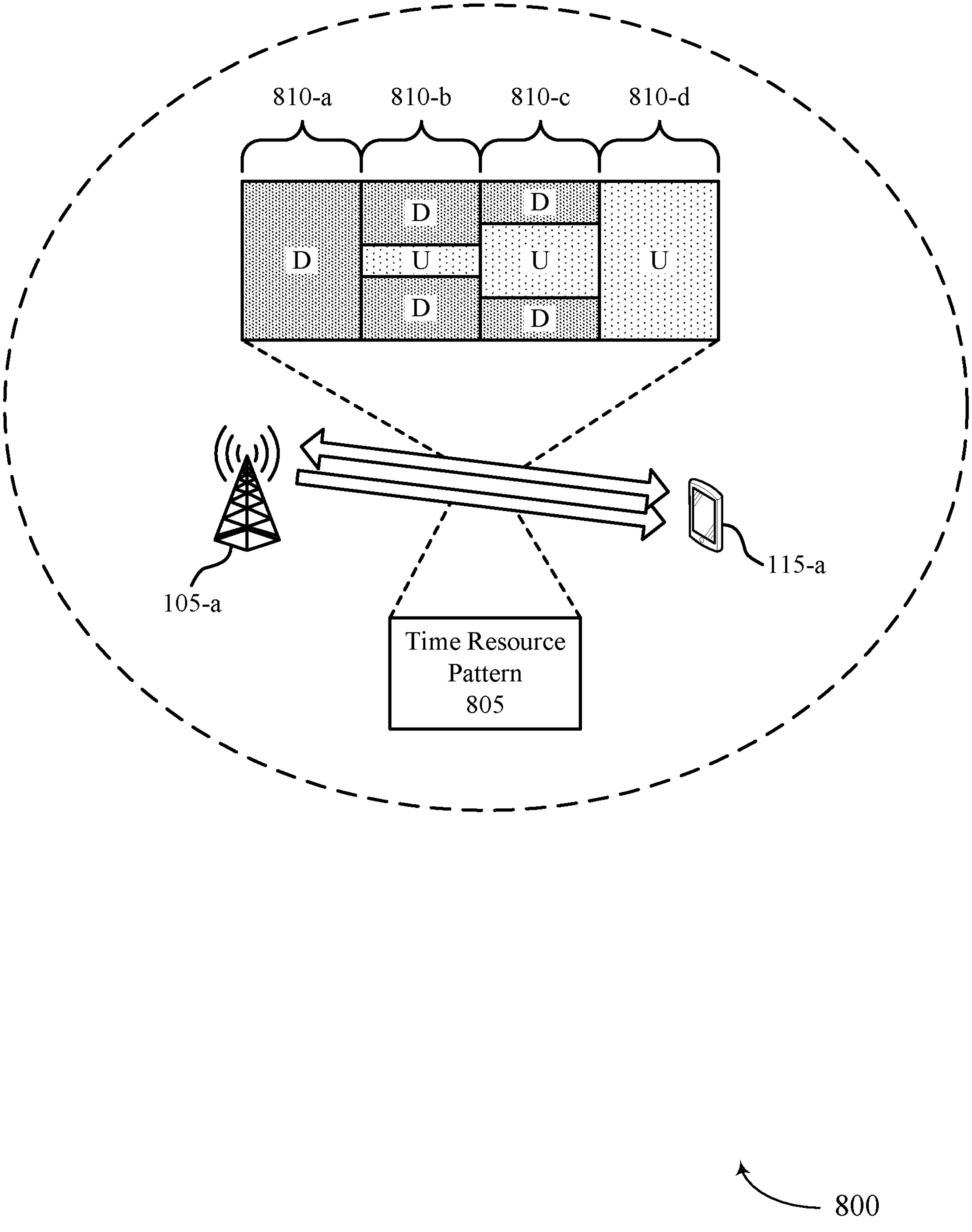
FIG. 8 illustrates an example of a wireless communications system that supports joint configuration of time and frequency resources for full duplex in accordance with one or more aspects of the present disclosure.

FIG. 8 illustrates an example of a wireless communications system 800 that supports joint configuration of time and frequency resources for full duplex in accordance with one or more aspects of the present disclosure. The wireless communications system 800 includes a network entity 105-*a*, which may be an example of a network entity in accordance with aspects of the present disclosure. The wireless communications system 800 also includes a UE 115-*a*, which may be an example of a UE in accordance with aspects of the present disclosure. The wireless communications system 800 may implement aspects of the wireless communications system 100. For instance, the wireless communications system 800 may support efficient techniques for configuring time and frequency resources for full duplex communications.

The network entity 105-*a* may transmit an indication of a time resource pattern 805 to the UE 115-*a*. The indication of the time resource pattern 805 may facilitate full duplex communications between the network entity 105-*a* and the UE 115-*a* and facilitate full duplex operation at the network entity 105-*a* when communicating with a full duplex aware UE (e.g., a half duplex UE). In some examples, the network entity 105-*a* may transmit the indication of the time resource pattern 805 via a semi-static configuration (e.g., via an RRC message or configuration, or other semi-static signaling). The time resource pattern 805 may jointly configure time resources (e.g., slots, mini-slots, symbols) and frequency resources (e.g., subbands) for full duplex communications. For instance, the time resource pattern 805 may be a semi-static configuration of a slot format and a subband split between downlink, uplink, and flexible resources which may be indicated jointly via a semi-static (e.g., RRC) parameter in a message that indicates a UE dedicated configuration or common configuration.

The time resource pattern 805 may be referred to as an SBFD time resource pattern and may be a periodical sequence of time resource types. For instance, the time resource pattern 805 may indicate a sequence of types of time resources for communications between the network entity 105-*a* and the UE 115-*a*. One or more types of time resources (i.e., time resource types) may be defined or added for full duplex communications. The time resource pattern 805 may indicate one or more time resource types for communications in a single link direction and one or more time resource types for full duplex communications. Examples of time resource types for communications in a single link direction include downlink ('D'), uplink ('U'), or flexible ('F'), and examples of time resource types for full duplex communications include 'D-U-D,' 'D-F-D,' 'U-D-U,' 'U-F-U,' 'F-U-F,' and 'F-D-F.'

A time resource type for full duplex communications may indicate a split of frequency resources of a time resource into multiple portions of frequency resources and associating each of the split frequency resources with a communication direction. For instance, a time resource type of D-U-D may indicate that a first (e.g., upper) portion of frequency resources in a time resource is allocated for downlink, a second (e.g., middle) portion of frequency resources in the time resource is allocated for uplink, and a third (e.g., lower) portion of frequency resources in the time resource is allocated for downlink. In addition, a time resource type may indicate the frequency resources in each portion of multiple portions of frequency resources in a time resource. As an example, for a time resource type of 'D-U-D,' there may be different possible splits of frequency resources into three portions of frequency resources (e.g., as in time resources 810-*b* and 810-*c* where different communication directions span different frequency ranges). As such, in this example, a time resource type may indicate the frequency resources in each of the three portions of frequency resources.

In some examples, in addition to the time resource pattern 805, the network entity 105-*a* may provide a configuration for each time resource type available for full duplex communications. In some other examples, the configuration for each time resource type may be accessible by the UE 115-*a* without signaling from the network entity 105-*a* (e.g., pre-configured at the UE 115-*a*). The configuration for a time resource type may provide different parameters for communicating in a time resource having the time resource type.

The configuration for a time resource type may include a first field (e.g., a slot-type-ID field) with an identifier of the time resource type. In some examples, a first identifier may be reserved for a downlink time resource type (e.g., ID0), a second identifier may be reserved for an uplink time resource type (e.g., ID1), a third identifier may be reserved for a flexible time resource type, or some combination thereof. Other identifiers may be available for time resource types defined for full duplex communications.

The configuration for a time resource type may also include a second field (e.g., a SubbandSplit field) indicating a split of frequency resources (e.g., subbands) in a time resource into multiple portions of frequency resources, where each portion of frequency resources is allocated for downlink, uplink, or flexible communications. The second field may provide an index for the indicated split of frequency resources from a set of options for splitting the frequency resources. In an example, the set of options for splitting the frequency resources may include 'D-U-D,' 'D-F-D,' 'U-D-U,' 'U-F-U,' 'F-U-F,' and 'F-D-F.' In some cases, each portion of frequency resources, as indicated by a split of frequency resources in the second field, may be assigned at least some frequency resources. In such cases, time resources (e.g., slots) with two portions of frequency resources (e.g., two subbands) may be defined explicitly by time resource types (e.g., slot types such as 'D-U,' 'D-F,' 'U-D,' and 'U-F'). In other cases, a portion of frequency resources as indicated by a split of frequency resources in the second field, may be assigned no frequency resources. In such cases, time resources (e.g., slots) with two portions of frequency resources (e.g., two subbands) may be defined explicitly or implicitly by time resource types (e.g., using a special case of a split into three subbands with one of the edge subbands being assigned no frequency resources).

The configuration for a time resource type may also include a third field (e.g., a SubbandFrequencyConfig field) indicating the frequency resources in each portion of frequency resources in a time resource (e.g., where each portion is indicated by the split in the second field). The frequency resources in each portion of frequency resources in a time resource may be defined using an SBConfig IE. The configuration may indicate the frequency resources in each portion of frequency resources in the time resource using one or more levels of granularity (e.g., using resource blocks, resource block groups, etc.). Different techniques for indicating the frequency resources (e.g., a range or quantity of frequency resources) in each portion of frequency resources in a time resource are described with reference to FIGS. 9 and 10.

Once the UE 115-*a* receives the time resource pattern 805 from the network entity 105-*a* and the network entity 105-*a* indicates a configuration for each time resource type included in the time resource pattern 805, the UE 115-*a* may determine a type of any time resource allocated for communications with the network entity 105-*a*. Table 1 provides examples of different time resource types.

TABLE 1

| Time resource types | | |
|---|---|---|
| Slot-type-ID | Subband-split | Frequency configuration |
| 0 | D | N/A |
| 1 | U | N/A |
| 2 | D-U-D | SBConfig0 |
| 3 | D-U-D | SBConfig1 |
| 4 | D-F-D | SBConfig0 |

The time resource pattern 805 (e.g., SBFD slot pattern) may be defined as a periodical sequence of slot-type-IDs. For instance, the time resource pattern 805 may include a sequence of slot types equal to {ID0, ID2, ID3, ID1}. That is, the time resource pattern 805 may indicate a first time resource type with a frequency resource split of 'D' and no frequency resource configuration for a first time resource 810-*a*, a second time resource type with a frequency resource split of 'D-U-D' and a frequency resource configuration indicated by SBconfig0 for a second time resource 810-*b*, a third time resource type with a frequency resource split of 'D-U-D' and a frequency resource configuration indicated by SBconfig1 for a third time resource 810-*c*, and a fourth time resource type with a frequency resource split of 'U' and no frequency resource configuration for a fourth time resource 810-*d*.

In some examples, the time resource pattern 805 may be indicated as one of multiple configurable or predefined time resource patterns (e.g., sequences of time resource types). Thus, there may be a limited quantity or a set of configurable or predefined time resource patterns (e.g., SBFD slot sequences). Each time resource pattern in the set of time resource patterns may have an identifier (e.g., each pattern identifier maps to a periodical sequence). Thus, the network entity 105-*a* may indicate the time resource pattern 805 using an identifier. In addition, a MAC-CE or slot format indicator (SFI) may switch an active pattern ID. A first time resource pattern of a set of configurable or predefined time resource patterns may be a default time resource pattern (e.g., for SBFD slots). Table 2 provides an example of a set of configurable or predefined time resource patterns.

TABLE 2

| Time resource patterns | | |
|---|---|---|
| Pattern ID | Periodicity | Sequence |
| 0 (default) | . . . ms | {0, 2, 2, 1} → {D, D-U-D-config0, D-U-D-config0, U} |
| 1 | . . . ms | . . . |
| 2 | . . . ms | . . . |
| 3 | . . . ms | . . . |

In some aspects, there may also be a limited quantity of configurable or predefined time resource types (e.g., SBFD slot types). In such cases, there may be limited flexibility for configuring time resources. Additionally, or alternatively, a split of frequency resources in a time resource (e.g., a subband split) may be limited to a quantity of configurations (e.g., N configurations) which may be predefined or configurable.

Figure 9:
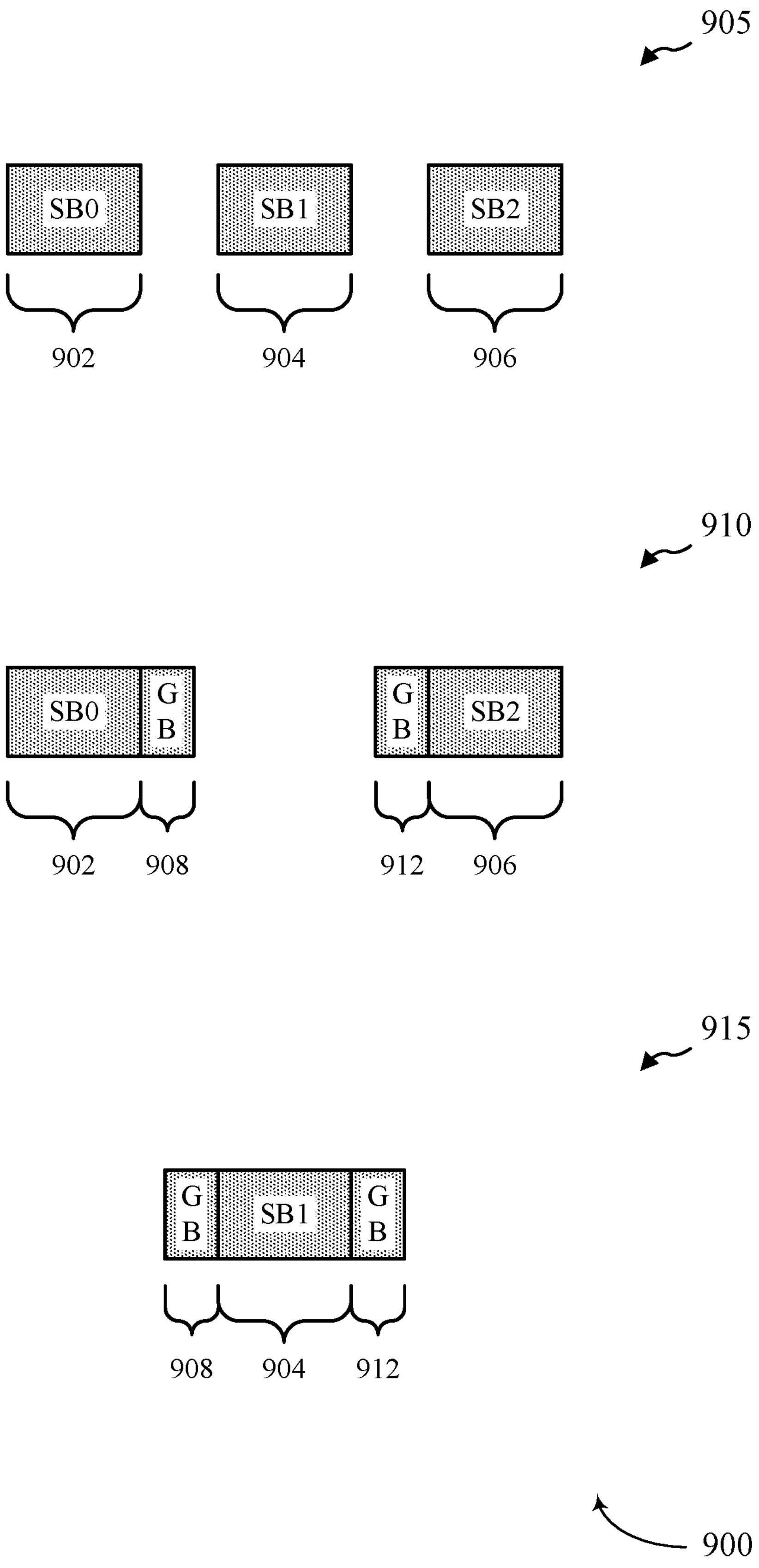
FIG. 9 illustrates an example of frequency resource configurations for full duplex communications in accordance with one or more aspects of the present disclosure.

FIG. 9 illustrates examples of frequency resource configurations 900 for full duplex communications in accordance with one or more aspects of the present disclosure. Various examples are provided for indicating the same frequency resources in a portion 902 of frequency resources, a guard band 908, a portion 904 of frequency resources, a guard band 912, and a portion 906 of frequency resources. The network entity 105-*a* may indicate a range in at least one portion of frequency resources in a time resource or in a guard band in a time resource.

In some examples, the network entity 105-*a* may indicate a range of frequency resources using a starting frequency resource in the range and an ending frequency resource in the range. For instance, an SBConfig may be defined as a starting resource block (RB_start) and an ending resource block (RB_end) for each subband or a subset of subbands. In some other examples, the network entity 105-*a* may indicate a range of frequency resources using a starting frequency resource in the range and a length of the range. For instance, an SBConfig may be defined as a starting resource block (RB_start) and a length for each subband or a subset of subbands. In some other examples, the network entity 105-*a* may indicate a range of frequency resources using an ending frequency resource in the range or a length of the range. For instance, in the second example 910 and the third example 915, the guard bands may be indicated with a single parameter (e.g., a length or an ending frequency resource), since the starting frequency resource of the guard bands may be implicit (e.g., based on inner or outer portions of frequency resources).

In a first example 905, the network entity 105-*a* may indicate a range of frequency resources in each portion of frequency resources in a time resource (e.g., the SBConfig IE may define frequency-domain resources for all subbands). In this example, guard bands or a range of frequency resources making up the guard bands in the time resource may be implicit from the indicated range of frequency resources in each portion of frequency resources in the time resource (e.g., guard bands may be implicitly known from all subbands). For instance, the network entity 105-*a* may indicate a range of frequency resources in a portion 902 of frequency resources, a range of frequency resources in a portion 904 of frequency resources, and a range of frequency resources in a portion 906 of frequency resources. A guard band between the portion 902 of frequency resources and the portion 904 of frequency resources may be implicit, and a guard band between the portion 904 of frequency resources and the portion 906 of frequency resources may be implicit.

In a second example 910, the network entity 105-*a* may indicate ranges of frequency resources in edge or outer portions of frequency resources and in guard bands adjacent to the edge or outer portions of frequency resources (e.g., the SBConfig IE may define frequency-domain resources for all edge subbands and guard bands). In this example, an inner portion of frequency resources between the guard bands may be implicit from the indicated range of frequency resources in the edge or outer portions of frequency resources and in guard bands adjacent to the edge or outer portions of frequency resources (e.g., an inner subband is implicitly known from edge subbands and guard bands). For instance, the network entity 105-*a* may indicate a range of frequency resources in a portion 902 of frequency resources, a range of frequency resources in a portion 906 of frequency resources, a range of frequency resources in a guard band 908, and a range of frequency resources in a guard band 912. An inner portion of frequency resources between the guard band 908 and the guard band 912 may be implicit.

In a third example 915, the network entity 105-*a* may indicate ranges of frequency resources in inner portions of frequency resources and in guard bands adjacent to the inner portions of frequency resources (e.g., the SBConfig IE may define frequency-domain resources for inner subbands and guard bands). In this example, outer portions of frequency resources (e.g., outer subbands) may be implicit from the indicated range of frequency resources in the inner portions of frequency resources and in guard bands adjacent to the inner portions of frequency resources (e.g., outer subbands may be implicitly known from inner subbands and guard bands). For instance, the network entity 105-*a* may indicate a range of frequency resources in a portion 904 of frequency resources, a range of frequency resources in a guard band 908, and a range of frequency resources in a guard band 912. An outer portion of frequency resources preceding the guard band 908 may be implicit, and an outer portion of frequency resources following the guard band 912 may be implicit.

Figure 10:
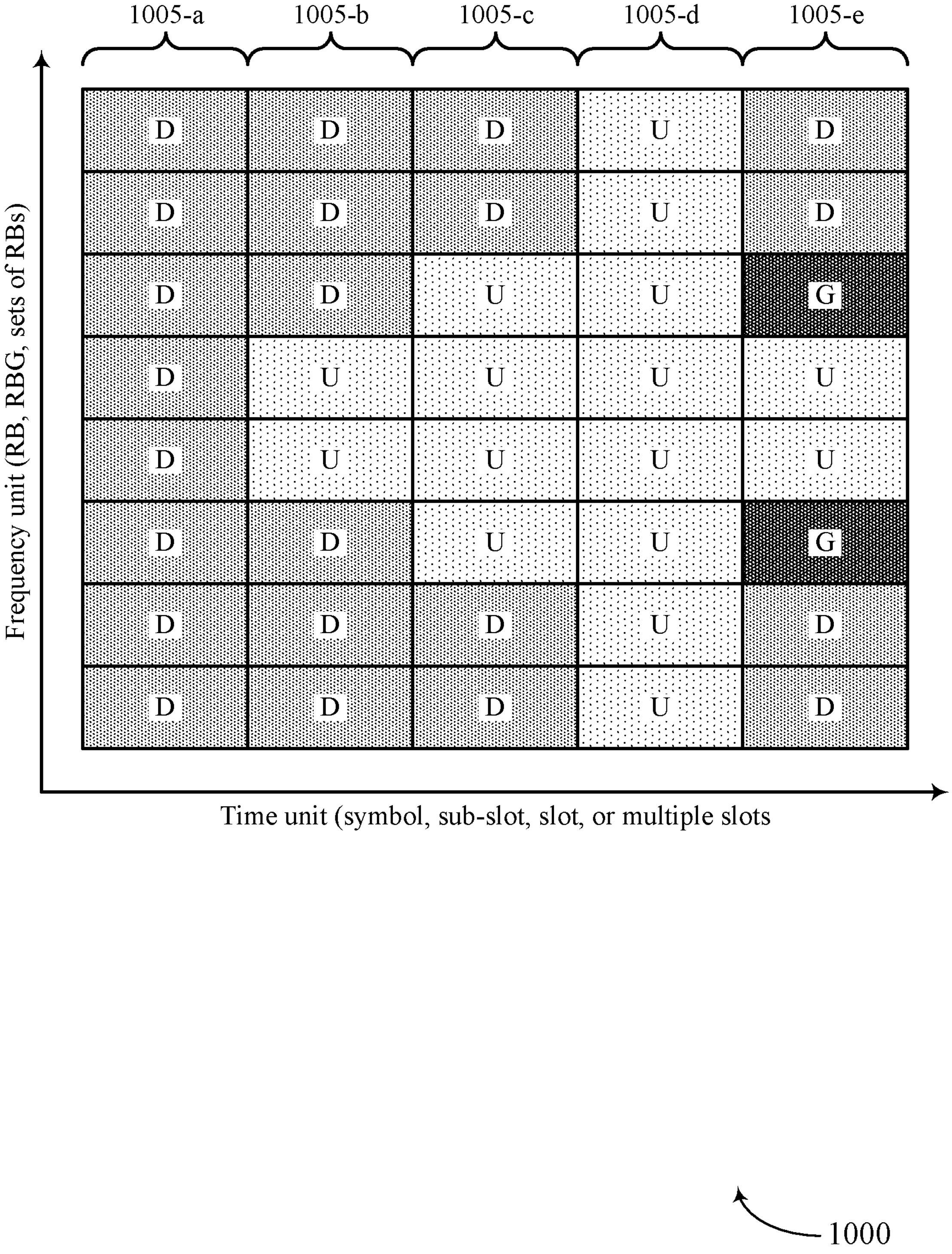
FIG. 10 illustrates an example of a frequency resource configuration for full duplex communications in accordance with one or more aspects of the present disclosure.

FIG. 10 illustrates an example of a frequency resource configuration 1000 for full duplex communications in accordance with one or more aspects of the present disclosure. The network entity 105-*a* may indicate a quantity of frequency resources in each portion of the multiple portions of frequency resources in a time resource. For instance, the network entity 105-*a* may provide an index or an indicator of an allocation of frequency resources in a time resource associated with a time resource type. The allocation of frequency resources may be a per-frequency-unit allocation, where a frequency unit may be a resource block, resource block group, subband, or a group of subcarriers.

Table 3 defines possible frequency allocations for a time resource, with each row representing one possible configuration. In the example of FIG. 10, the network entity 105-*a* may indicate a first time resource type with an index of zero for a first allocation of frequency resources in a first time resource 1005-*a*, a second time resource type with an index of three for a second allocation of frequency resources in a second time resource 1005-*b*, a third time resource type with an index of two for a third allocation of frequency resources in a third time resource 1005-*c*, a fourth time resource type with an index of one for a fourth allocation of frequency resources in a fourth time resource 1005-*d*, and a fifth time resource type with an index of four for a fifth allocation of frequency resources in a fifth time resource 1005-*e*.

TABLE 3

Indicators of per-frequency-unit allocations

| SlotFreq Indicator | Per-frequency-unit allocation |
|---|---|
| 0 | DDDDDDDD |
| 1 | UUUUUUUU |
| 2 | DDUUUUDD |
| 3 | DDDUUDDD |
| 4 | DDGUUGDD |

In an example, an indicator of two in a configuration of a time resource type of the third time resource 1005-*c* may be provided for a 'D-U-D' split of frequency resources and may indicate a per-frequency-unit allocation of frequency resources corresponding to 'DDUUUUDD.' This allocation of frequency resources may indicate that the time resource 1005-*c* includes a first portion of frequency resources with two frequency units allocated for downlink, a second portion of frequency resources with four frequency units allocated for uplink, and a third portion of frequency resources with two frequency units allocated for downlink. In some examples, a per-frequency-unit allocation of frequency resources may also include a guard band (e.g., a slotFreq indicator may have a guard band, as for a time resource type of time resource 1005-*e*). The frequency units allocated in a per-unit-frequency allocation may be resource blocks, resource block groups, subbands, or any group of subcarriers. In some examples, the frequency units may be selected to accommodate a smallest portion of frequency resources (e.g., subband) or guard band configuration.

In some examples, a time resource type included in a sequence of types of the time resource pattern 805 may indicate a per-frequency-unit allocation from a set of per-frequency-unit allocations (e.g., such as those included in Table 3). For instance, a third field in a configuration for the time resource type may indicate the per-frequency-unit allocation from the set of per-frequency-unit allocations. In some cases, the set of per-frequency-unit allocations may be preconfigured or defined at the UE 115-*a*. In other cases, a network entity 105-*a* may configure the set of per-frequency-unit allocations at the UE 115-*a*. The network entity 105-*a* may configure the set of per-frequency-unit allocations using an RRC parameter in a UE cell-common or UE dedicated configuration which may be common for all bandwidth parts or specific to a bandwidth part. The network entity 105-*a* may also reconfigure the set of per-frequency-unit allocations at the UE 115-*a*. For instance, a MAC-CE command may be used to update an RRC-configured set of per-frequency-unit allocations (e.g., by adding, removing, or modifying entries of Table 3). The network entity 105-*a* may convert any 'D,' 'G,' or 'U' configuration of a frequency unit into any other direction. For instance, the network entity 105-*a* may update the per-frequency-unit allocations configured at the UE 115-*a* from those in Table 3 to those in Table 4.

TABLE 4

Updated indicators of per-frequency-unit allocations

| SlotFreq Indicator | Per-frequency-unit allocation |
|---|---|
| 0 | DDDDDDDD |
| 1 | UUUUUUUU |
| 2 | DDUUUUDD |
| 3 | DDGUUGDD |
| 4 | DDGUUGDD |
| 5 | DDDDGUUU |

Figure 11:
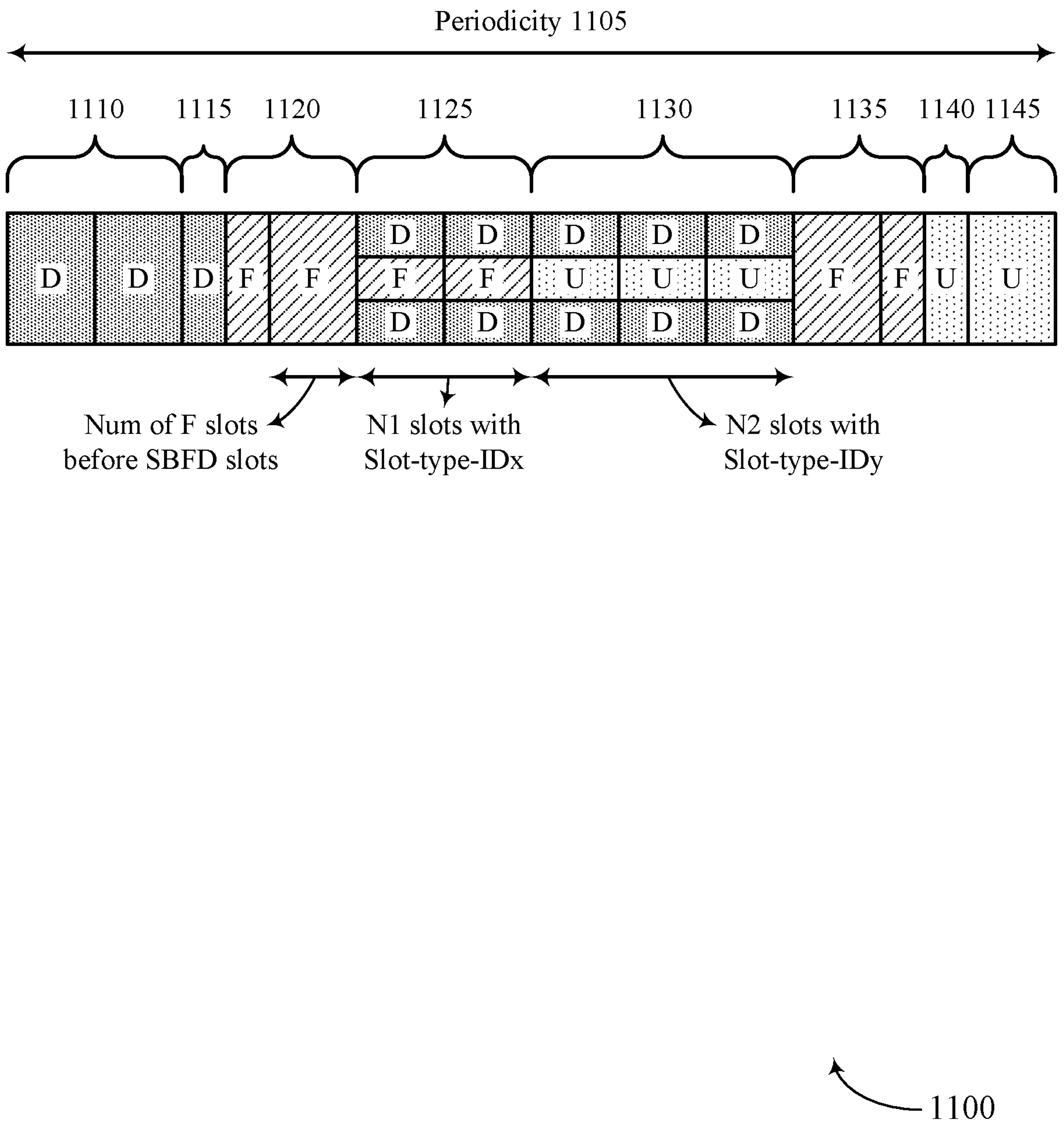
FIG. 11 illustrates an example of a time resource pattern for full duplex communications in accordance with one or more aspects of the present disclosure.

FIG. 11 illustrates an example of a time resource pattern 1100 for full duplex communications in accordance with one or more aspects of the present disclosure. A time resource pattern may include a sequence of time resource types. The sequence of time resource types may include one or more time resource types for communications in a single link direction and one or more time resource types for full duplex communications.

In some examples, a network entity 105 may indicate an identifier for each type in a sequence of time resource types of a time resource pattern. For instance, a configuration for a time resource pattern may include a pattern periodicity and a pattern slot type, and the pattern slot type may be a sequence of slot-type-IDs (e.g., up to a maximum number of time resources).

In the example of FIG. 11, a network entity 105 may indicate a quantity of each time resource type in a sequence of time resource types of the time resource pattern 1100. For instance, each slot type included in the time resource pattern 1100 may be defined by a slot-type-ID and a number of slots. In some examples, the time resource pattern may be indicated using an SBFD-UL-DL-Pattern IE. The SBFD-UL-DL-Pattern IE may indicate a periodicity 1105, a quantity (e.g., number) of downlink slots 1110 (e.g., at a beginning of the periodicity 1105), a quantity of downlink symbols 1115 (e.g., following the downlink slots 1110), a quantity of uplink slots 1145 (e.g., at an end of the periodicity 1105), and a quantity of uplink symbols 1140 (e.g., preceding the uplink slots 1145). The SBFD-UL-DL-Pattern IE may also indicate a quantity of slots or symbols 1125 with IDx (e.g., with a time resource type configured for full-duplex communications) and a quantity of slots or symbols 1130 with IDy (e.g., with a time resource type configured for full-duplex communications). In some examples, the SBFD-UL-DL-Pattern IE may also indicate a quantity of flexible time resources 1120 preceding SBFD slots (e.g., preceding time resources for full duplex communications). A quantity of flexible time resources 1135 following the SBFD slots may be implicit.

Figure 12:
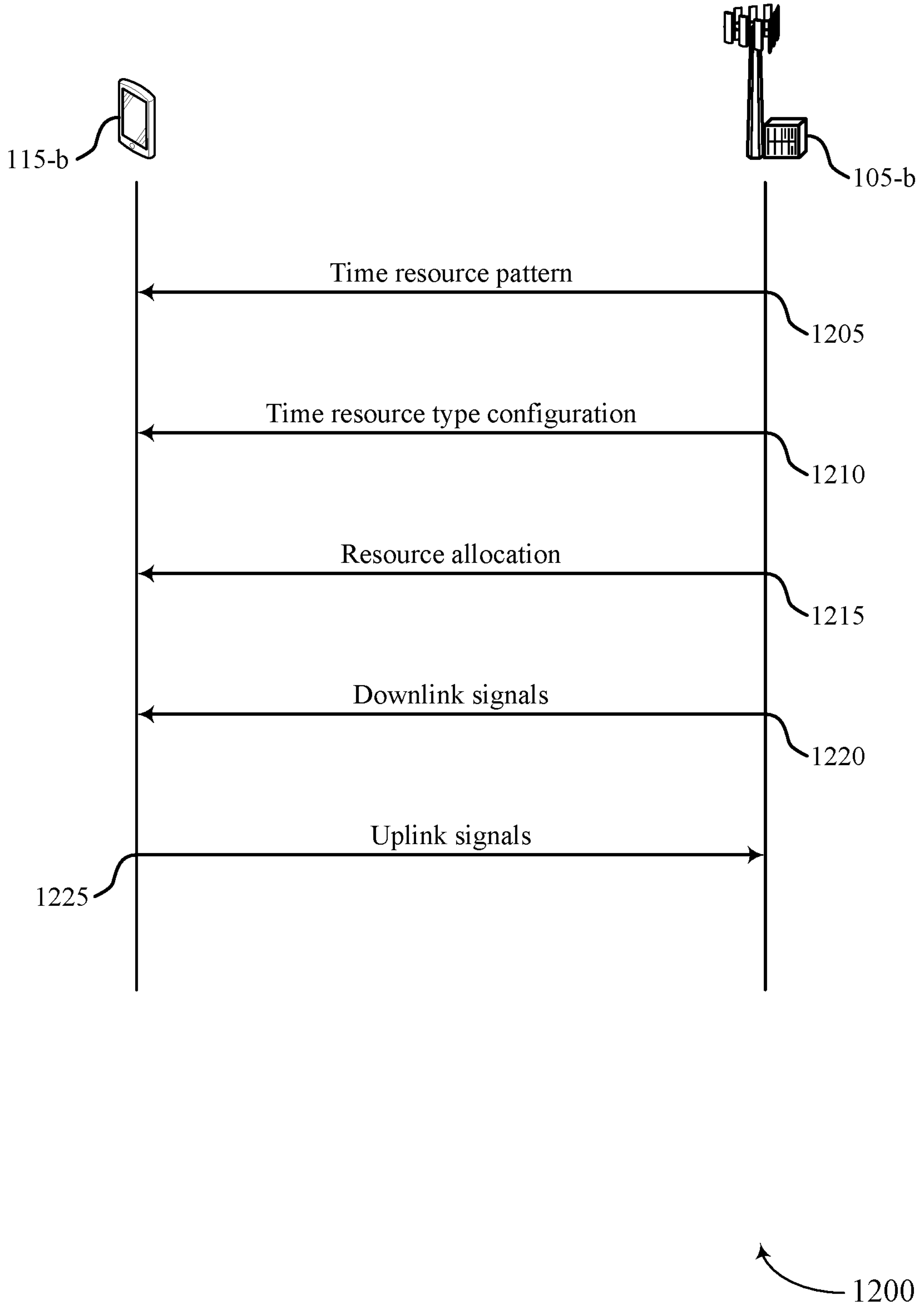
FIG. 12 illustrates an example of a process flow that supports joint configuration of time and frequency resources for full duplex in accordance with one or more aspects of the present disclosure.

FIG. 12 illustrates an example of a process flow 1200 that supports joint configuration of time and frequency resources for full duplex in accordance with one or more aspects of the present disclosure. The process flow 1200 includes a UE 115-*b*, which may be an example of a UE in accordance with aspects of the present disclosure. The process flow 1200 also includes a network entity 105-*b*, which may be an example of a network entity in accordance with aspects of the present disclosure. The process flow 1200 may implement aspects of the wireless communications system 100 or the wireless communications system 800. For instance, the process flow 1200 may support efficient techniques for configuring time and frequency resources for full duplex communications.

In the following description of the process flow 1200, the signaling exchanged between the UE 115-*b* and the network entity 105-*b* may be exchanged in a different order than the example order shown, or the operations performed by the UE 115-*b* and the network entity 105-*b* may be performed in different orders or at different times. Some operations may also be omitted from the process flow 1200, and other options may be added to the process flow 1200.

At 1205, the network entity 105-*b* may transmit, and the UE 115-*b* may receive, an indication of a time resource pattern including a sequence of types of multiple time resources. The sequence of types may include a first type of a first time resource of the multiple time resources, and the first type may indicate a split of frequency resources in the first time resource into multiple portions of frequency resources. The multiple portions of frequency resources may include a first portion of frequency resources allocated for downlink and a second portion of frequency resources allocated for uplink.

In some examples, each type of the sequence of types in the time resource pattern may be selected from one or more types, and the time resource pattern may be selected from one or more time resource patterns. The network entity 105-*b* may transmit, and the UE 115-*b* may receive, an indication of the one or more types from which each type of the sequence of types in the time resource pattern is selected, an indication of the one or more time resource patterns from which the time resource pattern is selected, or both.

The time resource pattern may be indicated by the network entity 105-*b* to the UE 115-*b* in advance of the multiple time resources being allocated. That is, after receiving the time resource pattern, the UE 115-*b* may determine the types of time resources allocated to the UE 115-*b* in the future based on the time resource pattern. The time resource pattern may also be indicated with a periodicity or may have a given length (e.g., selected from a set of periodicities or lengths). Thus, the UE 115-*b* may apply the time resource pattern periodically to determine the types of time resources allocated to the UE 115-*b*. For instance, if the time resource pattern indicates a sequence of two types with a first type and a second type of time resource, and the UE 115-*b* is allocated four time resources, the UE 115-*b* may determine that a first time resource has the first type, a second time resource has the second type, a third time resource has the first type, and a fourth time resource has the second type.

In some examples, the network entity 105-*b* may transmit, and the UE 115-*b* may receive, an indication of a respective identifier of each type of the sequence of types in the time resource pattern. In some other examples, the network entity 105-*b* may transmit, and the UE 115-*b* may receive, an indication of identifiers of distinct types of the sequence of types in the time resource pattern and a respective quantity of time resources having each of the distinct types in the multiple time resources. For instance, network entity 105-*b* may transmit, and the UE 115-*b* may receive, an indication of a first identifier of a first type and a first quantity of time resources having the first type, a second identifier of a second type and a second quantity of time resources having the second type, and so forth. The second quantity of time resources having the second type may follow the first quantity of time resources having the first type.

At 1210, the network entity 105-*b* may transmit, and the UE 115-*b* may receive, an indication of a configuration for the first type of the first time resource. The configuration for the first type may include an identifier of the first type, the split of frequency resources in the first time resource, and an indication of frequency resources in each portion of the multiple portions of frequency resources in the first time resource. In some aspects, the configuration for the first type may indicate a range of frequency resources in a portion of the multiple portions of frequency resources using a starting frequency resource and an ending frequency resource of the range, a starting frequency resource and a length of the range, or an ending frequency resource or length of the range (e.g., if a starting frequency resource of the range is implicit from an ending frequency resource or length of another range of frequency resources). In some aspects, the configuration for the first type may indicate a quantity of frequency resources in each portion of the multiple portions of frequency resources or a distribution of frequency resources into each portion of the multiple portions of frequency resources.

In one example, the network entity 105-*b* may transmit, and the UE 115-*b* may receive, an indication of a first range of frequency resources in the first portion of frequency resources and a second range of frequency resources in the second portion of frequency resources. The UE 115-*b* and the network entity 105-*b* may identify a guard band separating the first portion of frequency resources from the second portion of frequency resources based on the first range of frequency resources in the first portion of frequency resources and the second range of frequency resources in the second portion of frequency resources. For instance, frequency resources between the first portion of frequency resources and the second portion of frequency resources may implicitly make up a guard band.

In another example, the network entity 105-*b* may transmit, and the UE 115-*b* may receive, an indication of a first range of frequency resources in the first portion of frequency resources, a second range of frequency resources in the second portion of frequency resources, a third range of frequency resources including a first guard band adjacent to the first portion of frequency resources, and a fourth range of frequency resources including a second guard band adjacent to the second portion of frequency resources. The UE 115-*b* and the network entity 105-*b* may identify a third portion of frequency resources between the first guard band and the second guard band based on the third range of frequency resources making up the first guard band and the fourth range of frequency resources making up the second guard band. For instance, frequency resources between the first guard band and the second guard band may implicitly make up the third portion of frequency resources.

In yet another example, the network entity 105-*b* may transmit, and the UE 115-*b* may receive, an indication of a first range of frequency resources in the first portion of frequency resources and a second range of frequency resources including a guard band adjacent to the first portion of frequency resources. The UE 115-*b* and the network entity 105-*b* may identify a second portion of frequency resources adjacent to the guard band based on the second range of frequency resources making up the guard band. For instance, frequency resources following the guard band (e.g., up to an ending boundary of allocated frequency resources) or preceding the guard band (e.g., up to a starting boundary of allocated frequency resources) may implicitly make up the second portion of frequency resources.

In yet another example, the network entity 105-*b* may transmit, and the UE 115-*b* may receive, an indication of a first configuration of each frequency resource of the multiple frequency resources in the first time resource for uplink, downlink, or as a guard band. The first configuration may allocate the first portion of frequency resources for downlink and the second portion of frequency resources for uplink. The first configuration may be selected from one or more configurations of each frequency resource of the plurality of frequency resources in the first time resource for uplink, downlink, or as a guard band. In some examples, the network entity 105-*b* may transmit, and the UE 115-*b* may receive, an indication of the one or more configurations of each frequency resource of the multiple frequency resources in the first time resource for uplink, downlink, or as a guard band.

At 1215, the network entity 105-*b* may allocate the multiple time resources (e.g., in DCI) to the UE 115-*b* for communications with the UE 115-*b*. The UE 115-*b* may determine a type of each time resource based on the time resource pattern received at 1205. For instance, the UE 115-*b* may determine that the first time resource has the first type indicating a split of frequency resources in the first time resource into the first portion of frequency resources allocated for downlink and the second portion of frequency resources allocated for uplink.

At 1220, the UE 115-*b* may receive downlink signals from the network entity 105-*b* on the first portion of frequency resources in the first time resource, and the network entity 105-*b* may transmit downlink signals to the UE 115-*b* on the first portion of frequency resources in the first time resource.

At 1225, the UE 115-*b* may transmit uplink signals to the network entity 105-*b* on the second portion of frequency resources in the first time resource, and the network entity 105-*b* may receive uplink signals from the UE 115-*b* on the second portion of frequency resources in the first time resource.

Figure 13:
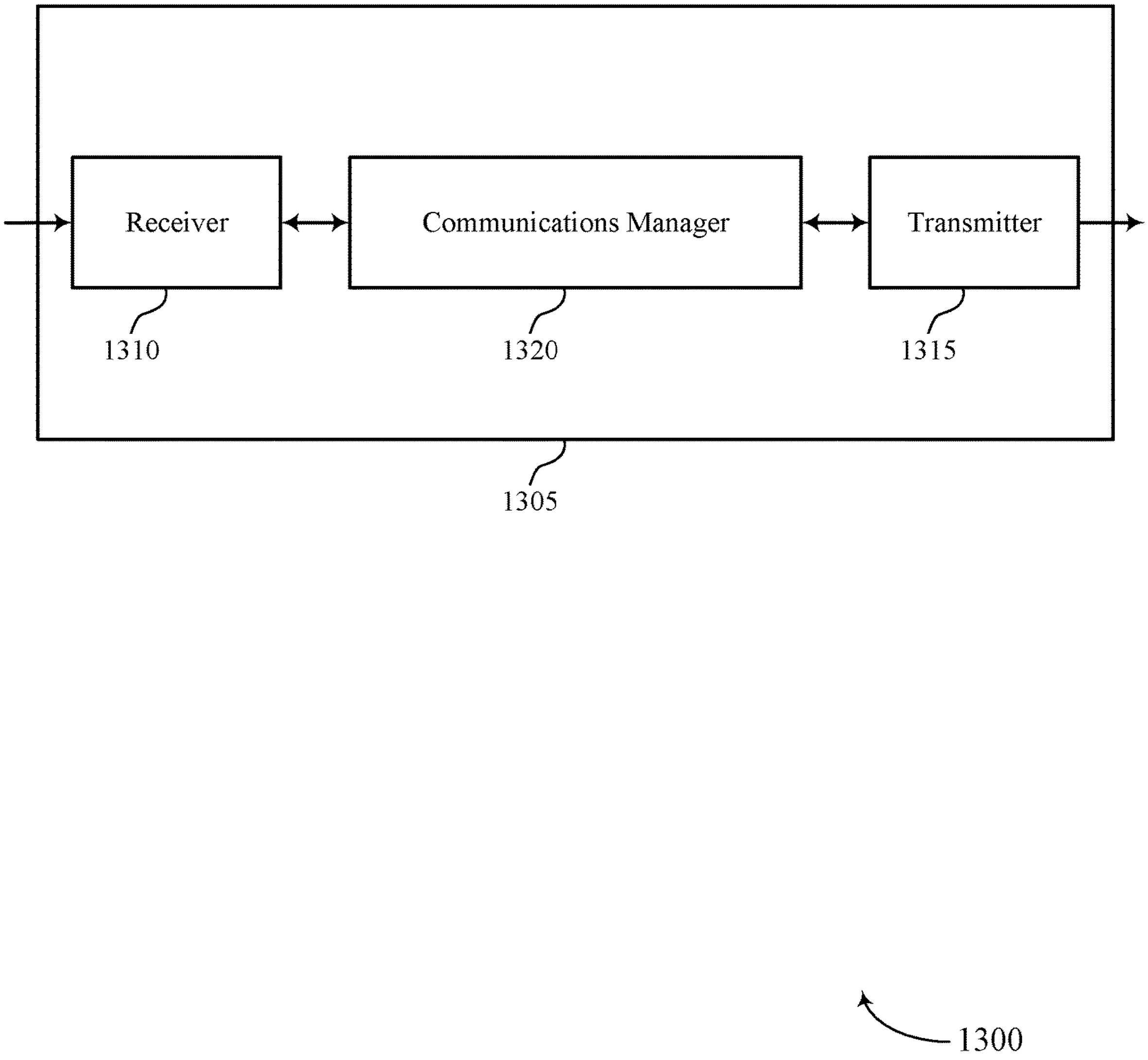
FIGS. 13 and 14 show block diagrams of devices that support joint configuration of time and frequency resources for full duplex in accordance with one or more aspects of the present disclosure.

FIG. 13 shows a block diagram 1300 of a device 1305 that supports joint configuration of time and frequency resources for full duplex in accordance with one or more aspects of the present disclosure. The device 1305 may be an example of aspects of a UE 115 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to joint configuration of time and frequency resources for full duplex). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to joint configuration of time and frequency resources for full duplex). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of joint configuration of time and frequency resources for full duplex as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1320 may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication at a UE in accordance with examples as disclosed herein. For example, the communications manager 1320 may be configured as or otherwise support a means for receiving, from a network entity, an indication of a time resource pattern including a sequence of types of a set of multiple time resources, the sequence of types including a first type of a first time resource of the set of multiple time resources, the first type indicating a split of a set of multiple frequency resources in the first time resource into a set of multiple portions of frequency resources, the set of multiple portions of frequency resources including a first portion of frequency resources allocated for downlink and a second portion of frequency resources allocated for uplink. The communications manager 1320 may be configured as or otherwise support a means for receiving downlink signals from the network entity on the first portion of frequency resources in the first time resource. The communications manager 1320 may be configured as or otherwise support a means for transmitting uplink signals to the network entity on the second portion of frequency resources in the first time resource.

By including or configuring the communications manager 1320 in accordance with examples as described herein, the device 1305 (e.g., a processor controlling or otherwise coupled with the receiver 1310, the transmitter 1315, the communications manager 1320, or a combination thereof) may support techniques for more efficient utilization of communication resources. In particular, using the techniques described herein, the device 1305 may be configured with time and frequency resources for full duplex communications with a network entity 105. As a result, the device 1305 may be able to maximize the use of allocated resources or more efficiently utilize communication resources (e.g., by simultaneously transmitting and receiving using the communication resources).

Figure 14:
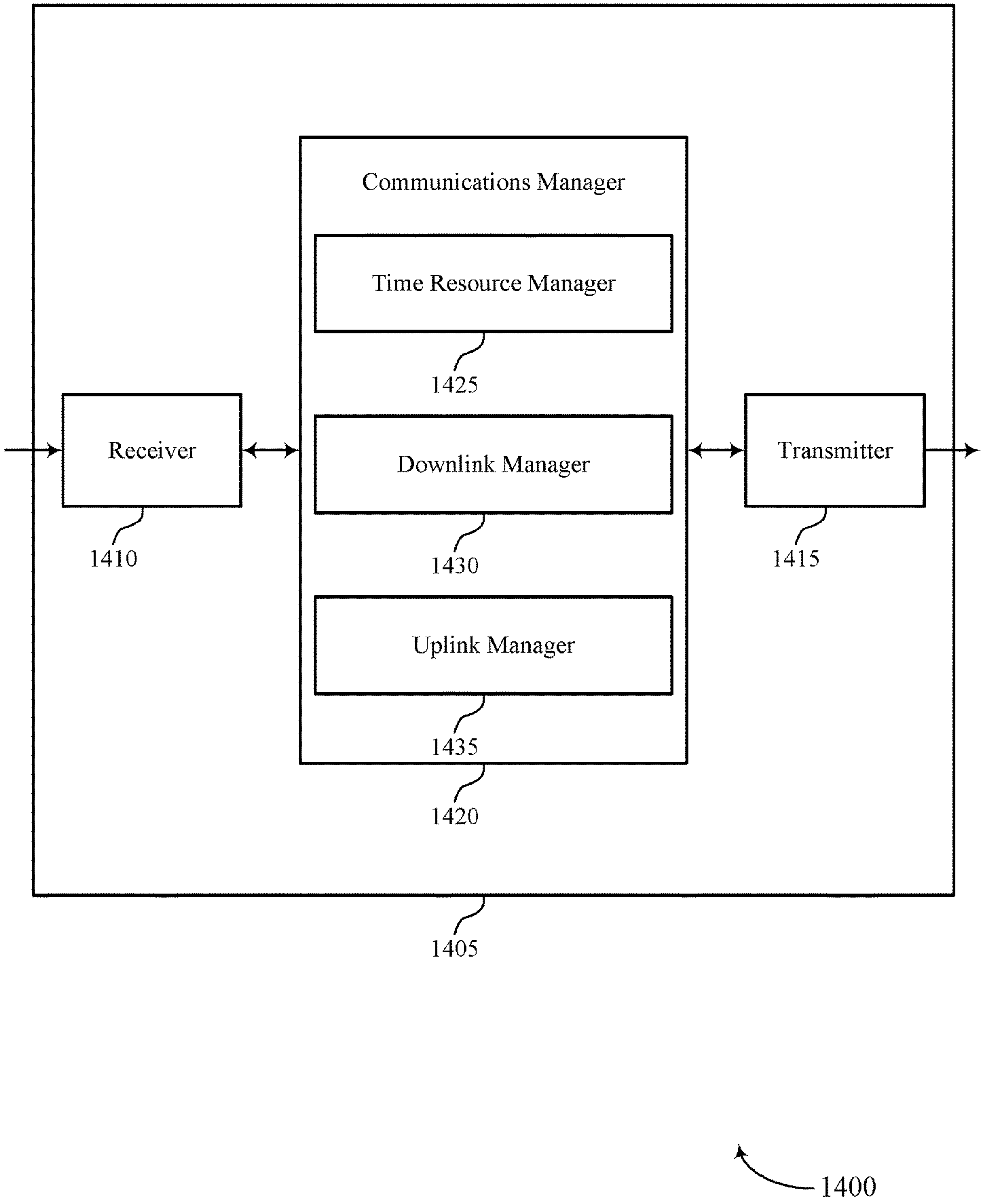

FIG. 14 shows a block diagram 1400 of a device 1405 that supports joint configuration of time and frequency resources for full duplex in accordance with one or more aspects of the present disclosure. The device 1405 may be an example of aspects of a device 1305 or a UE 115 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to joint configuration of time and frequency resources for full duplex). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to joint configuration of time and frequency resources for full duplex). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of joint configuration of time and frequency resources for full duplex as described herein. For example, the communications manager 1420 may include a time resource manager 1425, a downlink manager 1430, an uplink manager 1435, or any combination thereof. The communications manager 1420 may be an example of aspects of a communications manager 1320 as described herein. In some examples, the communications manager 1420, or various components thereof, may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communication at a UE in accordance with examples as disclosed herein. The time resource manager 1425 may be configured as or otherwise support a means for receiving, from a network entity, an indication of a time resource pattern including a sequence of types of a set of multiple time resources, the sequence of types including a first type of a first time resource of the set of multiple time resources, the first type indicating a split of a set of multiple frequency resources in the first time resource into a set of multiple portions of frequency resources, the set of multiple portions of frequency resources including a first portion of frequency resources allocated for downlink and a second portion of frequency resources allocated for uplink. The downlink manager 1430 may be configured as or otherwise support a means for receiving downlink signals from the network entity on the first portion of frequency resources in the first time resource. The uplink manager 1435 may be configured as or otherwise support a means for transmitting uplink signals to the network entity on the second portion of frequency resources in the first time resource.

Figure 15:
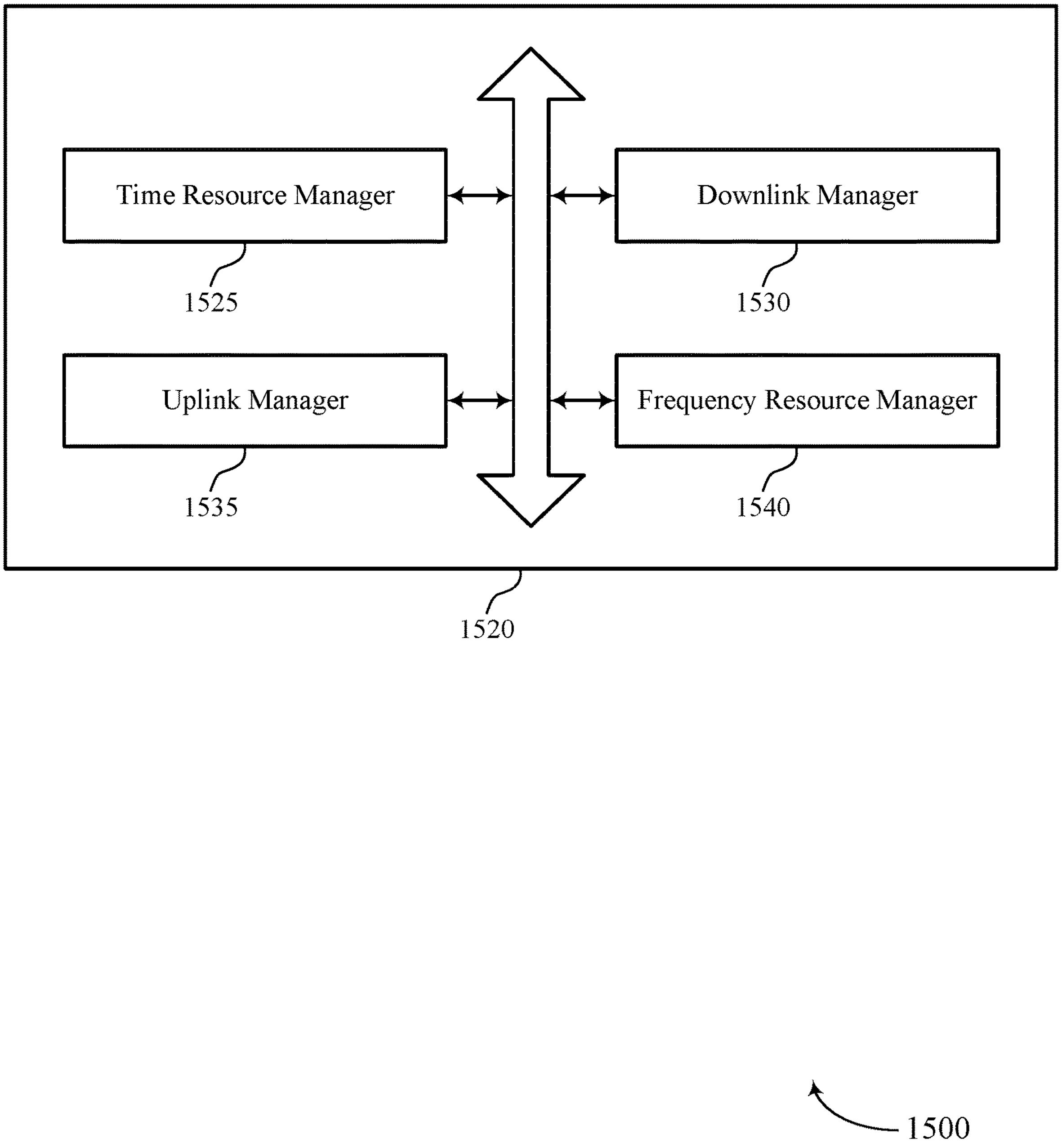
FIG. 15 shows a block diagram of a communications manager that supports joint configuration of time and frequency resources for full duplex in accordance with one or more aspects of the present disclosure.

FIG. 15 shows a block diagram 1500 of a communications manager 1520 that supports joint configuration of time and frequency resources for full duplex in accordance with one or more aspects of the present disclosure. The communications manager 1520 may be an example of aspects of a communications manager 1320, a communications manager 1420, or both, as described herein. The communications manager 1520, or various components thereof, may be an example of means for performing various aspects of joint configuration of time and frequency resources for full duplex as described herein. For example, the communications manager 1520 may include a time resource manager 1525, a downlink manager 1530, an uplink manager 1535, a frequency resource manager 1540, or any combination thereof. Each of these components may communicate, directly or indirectly, with one another (e.g., via one or more buses).

The communications manager 1520 may support wireless communication at a UE in accordance with examples as disclosed herein. The time resource manager 1525 may be configured as or otherwise support a means for receiving, from a network entity, an indication of a time resource pattern including a sequence of types of a set of multiple time resources, the sequence of types including a first type of a first time resource of the set of multiple time resources, the first type indicating a split of a set of multiple frequency resources in the first time resource into a set of multiple portions of frequency resources, the set of multiple portions of frequency resources including a first portion of frequency resources allocated for downlink and a second portion of frequency resources allocated for uplink. The downlink manager 1530 may be configured as or otherwise support a means for receiving downlink signals from the network entity on the first portion of frequency resources in the first time resource. The uplink manager 1535 may be configured as or otherwise support a means for transmitting uplink signals to the network entity on the second portion of frequency resources in the first time resource.

In some examples, the time resource manager 1525 may be configured as or otherwise support a means for receiving an indication of a configuration for the first type of the first time resource, the configuration for the first type including an identifier of the first type, the split of frequency resources in the first time resource, and an indication of frequency resources in each portion of the set of multiple portions of frequency resources in the first time resource.

In some examples, the frequency resource manager 1540 may be configured as or otherwise support a means for receiving an indication of a first range of frequency resources in the first portion of frequency resources and a second range of frequency resources in the second portion of frequency resources, where a guard band separating the first portion of frequency resources from the second portion of frequency resources is identified based on the first range of frequency resources in the first portion of frequency resources and the second range of frequency resources in the second portion of frequency resources.

In some examples, the frequency resource manager 1540 may be configured as or otherwise support a means for receiving, for each of the first range of frequency resources and the second range of frequency resources, a starting frequency resource and an ending frequency resource of each range, a starting frequency resource and a length of each range, an ending frequency resource of each range, or a length of each range.

In some examples, the frequency resource manager 1540 may be configured as or otherwise support a means for receiving an indication of a first range of frequency resources in the first portion of frequency resources, a second range of frequency resources in the second portion of frequency resources, a third range of frequency resources including a first guard band adjacent to the first portion of frequency resources, and a fourth range of frequency resources including a second guard band adjacent to the second portion of frequency resources, where a third portion of frequency resources between the first guard band and the second guard band is identified based on the third range of frequency resources including the first guard band and the fourth range of frequency resources including the second guard band.

In some examples, the frequency resource manager 1540 may be configured as or otherwise support a means for receiving, for each of the first range of frequency resources, the second range of frequency resources, the third range of frequency resources, and the fourth range of frequency resources, a starting frequency resource and an ending frequency resource of each range, a starting frequency resource and a length of each range, an ending frequency resource of each range, or a length of each range.

In some examples, the frequency resource manager 1540 may be configured as or otherwise support a means for receiving an indication of a first range of frequency resources in the first portion of frequency resources and a second range of frequency resources including a guard band adjacent to the first portion of frequency resources, where the second portion of frequency resources is adjacent to the guard band and is identified based on the second range of frequency resources including the guard band.

In some examples, the frequency resource manager 1540 may be configured as or otherwise support a means for receiving, for each of the first range of frequency resources and the second range of frequency resources, a starting frequency resource and an ending frequency resource of each range, a starting frequency resource and a length of each range, an ending frequency resource of each range, or a length of each range.

In some examples, to support receiving the indication of the time resource pattern, the time resource manager 1525 may be configured as or otherwise support a means for receiving an indication of a respective identifier of each type of the sequence of types in the time resource pattern.

In some examples, to support receiving the indication of the time resource pattern, the time resource manager 1525 may be configured as or otherwise support a means for receiving an indication of identifiers of distinct types of the sequence of types in the time resource pattern and a respective quantity of time resources having each of the distinct types in the set of multiple time resources.

In some examples, each type of the sequence of types in the time resource pattern is selected from one or more types, and the time resource pattern is selected from one or more time resource patterns.

In some examples, the time resource manager 1525 may be configured as or otherwise support a means for receiving an indication of the one or more types from which each type of the sequence of types in the time resource pattern is selected, an indication of the one or more time resource patterns from which the time resource pattern is selected, or both.

In some examples, the frequency resource manager 1540 may be configured as or otherwise support a means for receiving an indication of a first configuration of each frequency resource of the set of multiple frequency resources in the first time resource for uplink, downlink, or as a guard band, the first configuration allocating the first portion of frequency resources for downlink and the second portion of frequency resources for uplink.

In some examples, the first configuration is selected from one or more configurations of each frequency resource of the set of multiple frequency resources in the first time resource for uplink, downlink, or as a guard band.

In some examples, the frequency resource manager 1540 may be configured as or otherwise support a means for receiving an indication of the one or more configurations of each frequency resource of the set of multiple frequency resources in the first time resource for uplink, downlink, or as a guard band.

In some examples, the time resources include slots, symbols, or a group of symbols, and the frequency resources include resource blocks, resource block groups, subbands, or a group of subcarriers.

Figure 16:
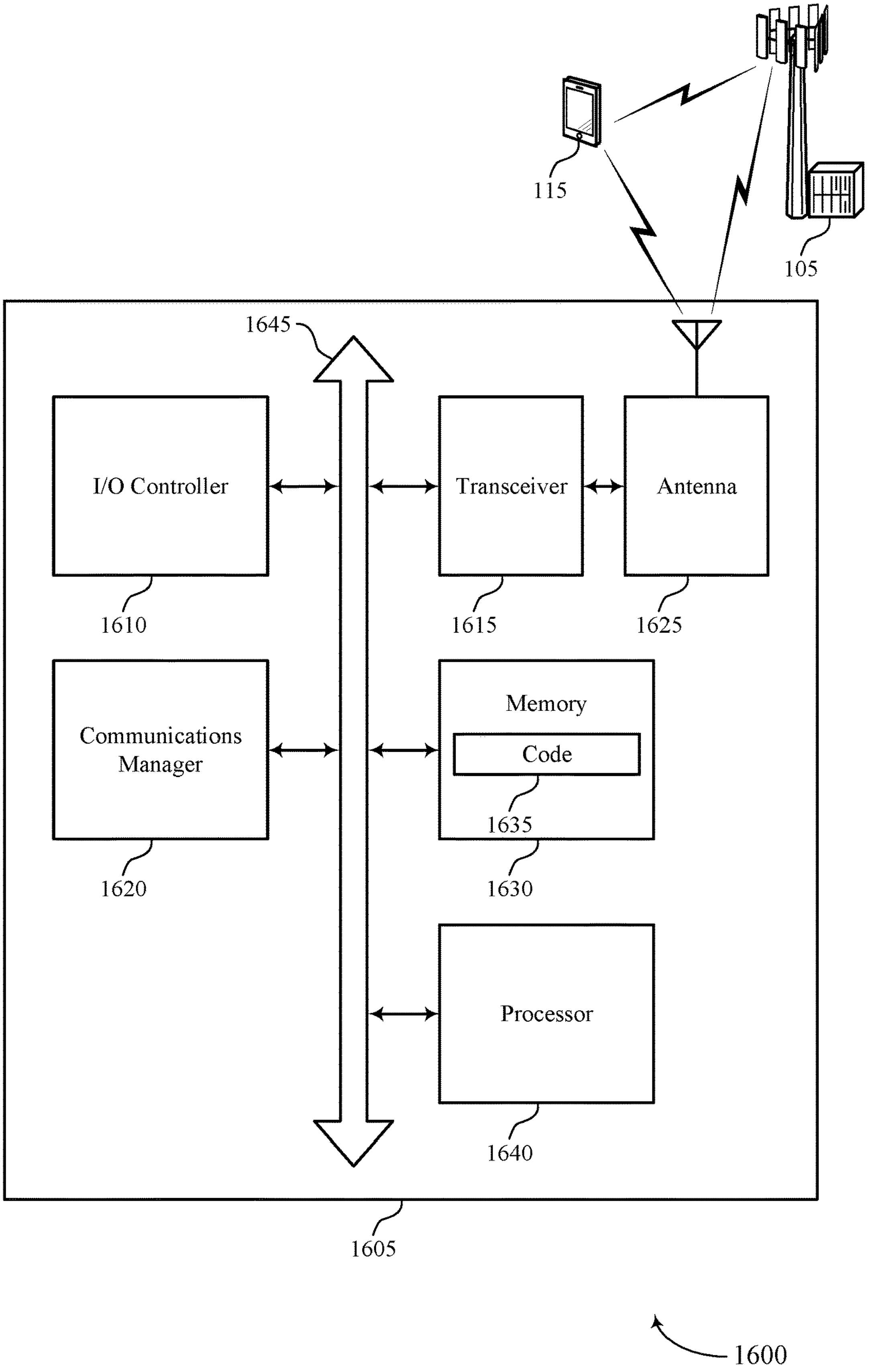
FIG. 16 shows a diagram of a system including a device that supports joint configuration of time and frequency resources for full duplex in accordance with one or more aspects of the present disclosure.

FIG. 16 shows a diagram of a system 1600 including a device 1605 that supports joint configuration of time and frequency resources for full duplex in accordance with one or more aspects of the present disclosure. The device 1605 may be an example of or include the components of a device 1305, a device 1405, or a UE 115 as described herein. The device 1605 may communicate (e.g., wirelessly) with one or more network entities 105, one or more UEs 115, or any combination thereof. The device 1605 may include components for bi-directional voice and data communications including components for transmitting and receiving communications, such as a communications manager 1620, an input/output (I/O) controller 1610, a transceiver 1615, an antenna 1625, a memory 1630, code 1635, and a processor 1640. These components may be in electronic communication or otherwise coupled (e.g., operatively, communicatively, functionally, electronically, electrically) via one or more buses (e.g., a bus 1645).

The I/O controller 1610 may manage input and output signals for the device 1605. The I/O controller 1610 may also manage peripherals not integrated into the device 1605. In some cases, the I/O controller 1610 may represent a physical connection or port to an external peripheral. In some cases, the I/O controller 1610 may utilize an operating system such as iOS®, ANDROID®, MS-DOS®, MS-WIN- DOWS®, OS/2®, UNIX®, LINUX®, or another known operating system. Additionally, or alternatively, the I/O controller 1610 may represent or interact with a modem, a keyboard, a mouse, a touchscreen, or a similar device. In some cases, the I/O controller 1610 may be implemented as part of a processor, such as the processor 1640. In some cases, a user may interact with the device 1605 via the I/O controller 1610 or via hardware components controlled by the I/O controller 1610.

In some cases, the device 1605 may include a single antenna 1625. However, in some other cases, the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include random access memory (RAM) and read-only memory (ROM). The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a basic I/O system (BIOS) which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting joint configuration of time and frequency resources for full duplex). For example, the device 1605 or a component of the device 1605 may include a processor 1640 and memory 1630 coupled with or to the processor 1640, the processor 1640 and memory 1630 configured to perform various functions described herein.

The communications manager 1620 may support wireless communication at a UE in accordance with examples as disclosed herein. For example, the communications manager 1620 may be configured as or otherwise support a means for receiving, from a network entity, an indication of a time resource pattern including a sequence of types of a set of multiple time resources, the sequence of types including a first type of a first time resource of the set of multiple time resources, the first type indicating a split of a set of multiple frequency resources in the first time resource into a set of multiple portions of frequency resources, the set of multiple portions of frequency resources including a first portion of frequency resources allocated for downlink and a second portion of frequency resources allocated for uplink. The communications manager 1620 may be configured as or otherwise support a means for receiving downlink signals from the network entity on the first portion of frequency resources in the first time resource. The communications manager 1620 may be configured as or otherwise support a means for transmitting uplink signals to the network entity on the second portion of frequency resources in the first time resource.

By including or configuring the communications manager 1620 in accordance with examples as described herein, the device 1605 may support techniques for more efficient utilization of communication resources. In particular, using the techniques described herein, the device 1605 may be configured with time and frequency resources for full duplex communications with a network entity 105. As a result, the device 1605 may be able to maximize the use of allocated resources or more efficiently utilize communication resources (e.g., by simultaneously transmitting and receiving on the communication resources).

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of joint configuration of time and frequency resources for full duplex as described herein, or the processor 1640 and the memory 1630 may be otherwise configured to perform or support such operations.

Figure 17:
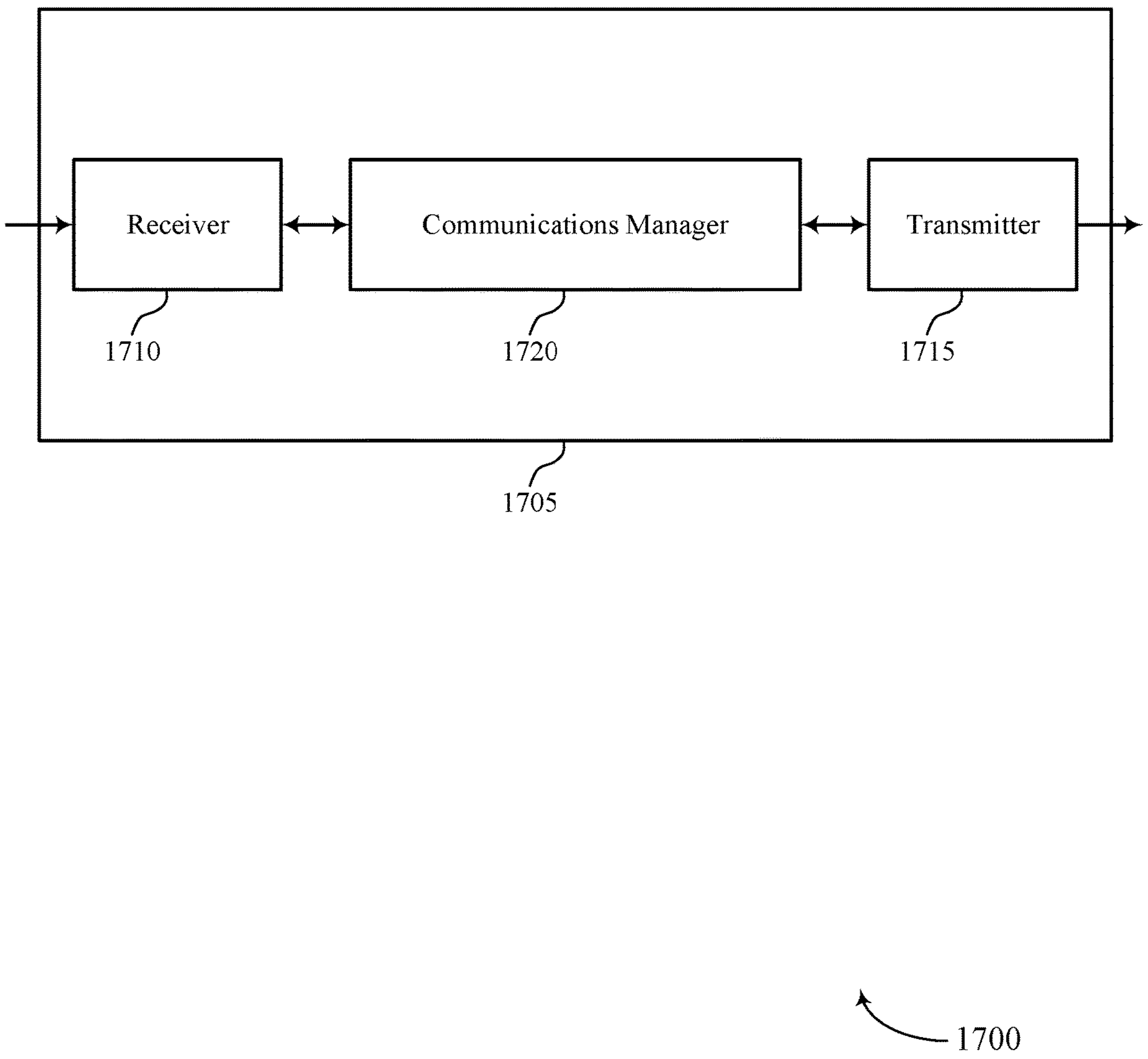
FIGS. 17 and 18 show block diagrams of devices that support joint configuration of time and frequency resources for full duplex in accordance with one or more aspects of the present disclosure.

FIG. 17 shows a block diagram 1700 of a device 1705 that supports joint configuration of time and frequency resources for full duplex in accordance with one or more aspects of the present disclosure. The device 1705 may be an example of aspects of a network entity 105 as described herein. The device 1705 may include a receiver 1710, a transmitter 1715, and a communications manager 1720. The device 1705 may also include a processor. Each of these components may be in communication with one another (e.g., via one or more buses).

The receiver 1710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1705. In some examples, the receiver 1710 may support obtaining information by receiving signals via one or more antennas. Additionally, or alternatively, the receiver 1710 may support obtaining information by receiving signals via one or more wired (e.g., electrical, fiber optic) interfaces, wireless interfaces, or any combination thereof.

The transmitter 1715 may provide a means for outputting (e.g., transmitting, providing, conveying, sending) information generated by other components of the device 1705. For example, the transmitter 1715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1715 may support outputting information by transmitting signals via one or more antennas. Additionally, or alternatively, the transmitter 1715 may support outputting information by transmitting signals via one or more wired (e.g., electrical, fiber optic) interfaces, wireless interfaces, or any combination thereof. In some examples, the transmitter 1715 and the receiver 1710 may be co-located in a transceiver, which may include or be coupled with a modem.

The communications manager 1720, the receiver 1710, the transmitter 1715, or various combinations thereof or various components thereof may be examples of means for performing various aspects of joint configuration of time and frequency resources for full duplex as described herein. For example, the communications manager 1720, the receiver 1710, the transmitter 1715, or various combinations or components thereof may support a method for performing one or more of the functions described herein.

In some examples, the communications manager 1720, the receiver 1710, the transmitter 1715, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1720, the receiver 1710, the transmitter 1715, or various combinations or components thereof may be implemented in code (e.g., as communications management software or firmware) executed by a processor. If implemented in code executed by a processor, the functions of the communications manager 1720, the receiver 1710, the transmitter 1715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1720 may be configured to perform various operations (e.g., receiving, obtaining, monitoring, outputting, transmitting) using or otherwise in cooperation with the receiver 1710, the transmitter 1715, or both. For example, the communications manager 1720 may receive information from the receiver 1710, send information to the transmitter 1715, or be integrated in combination with the receiver 1710, the transmitter 1715, or both to obtain information, output information, or perform various other operations as described herein.

The communications manager 1720 may support wireless communication at a network entity in accordance with examples as disclosed herein. For example, the communications manager 1720 may be configured as or otherwise support a means for transmitting, to a UE, an indication of a time resource pattern including a sequence of types of a set of multiple time resources, the sequence of types including a first type of a first time resource of the set of multiple time resources, the first type indicating a split of a set of multiple frequency resources in the first time resource into a set of multiple portions of frequency resources, the set of multiple portions of frequency resources including a first portion of frequency resources allocated for downlink and a second portion of frequency resources allocated for uplink. The communications manager 1720 may be configured as or otherwise support a means for transmitting downlink signals to the UE on the first portion of frequency resources in the first time resource. The communications manager 1720 may be configured as or otherwise support a means for receiving uplink signals from the UE on the second portion of frequency resources in the first time resource.

By including or configuring the communications manager 1720 in accordance with examples as described herein, the device 1705 (e.g., a processor controlling or otherwise coupled with the receiver 1710, the transmitter 1715, the communications manager 1720, or a combination thereof) may support techniques for more efficient utilization of communication resources. In particular, using the techniques described herein, the device 1705 may be configured with time and frequency resources for full duplex communications with a network entity 105. As a result, the device 1705 may be able to maximize the use of allocated resources or more efficiently utilize communication resources (e.g., by simultaneously transmitting and receiving on the communication resources).

Figure 18:
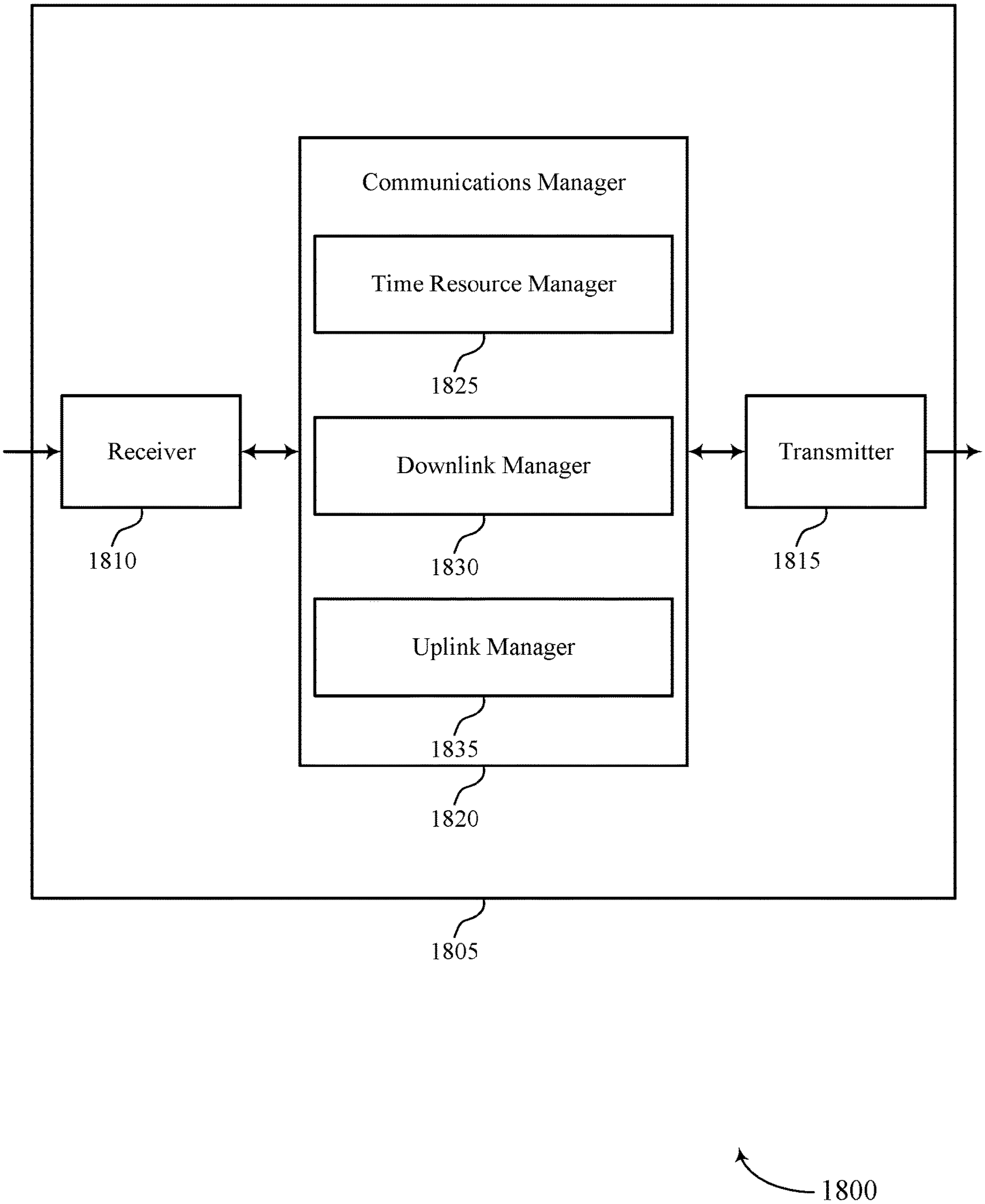

FIG. 18 shows a block diagram 1800 of a device 1805 that supports joint configuration of time and frequency resources for full duplex in accordance with one or more aspects of the present disclosure. The device 1805 may be an example of aspects of a device 1705 or a network entity 105 as described herein. The device 1805 may include a receiver 1810, a transmitter 1815, and a communications manager 1820. The device 1805 may also include a processor. Each of these components may be in communication with one another (e.g., via one or more buses).

The receiver 1810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1805. In some examples, the receiver 1810 may support obtaining information by receiving signals via one or more antennas. Additionally, or alternatively, the receiver 1810 may support obtaining information by receiving signals via one or more wired (e.g., electrical, fiber optic) interfaces, wireless interfaces, or any combination thereof.

The transmitter 1815 may provide a means for outputting (e.g., transmitting, providing, conveying, sending) information generated by other components of the device 1805. For example, the transmitter 1815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1815 may support outputting information by transmitting signals via one or more antennas. Additionally, or alternatively, the transmitter 1815 may support outputting information by transmitting signals via one or more wired (e.g., electrical, fiber optic) interfaces, wireless interfaces, or any combination thereof. In some examples, the transmitter 1815 and the receiver 1810 may be co-located in a transceiver, which may include or be coupled with a modem.

The device 1805, or various components thereof, may be an example of means for performing various aspects of joint configuration of time and frequency resources for full duplex as described herein. For example, the communications manager 1820 may include a time resource manager 1825, a downlink manager 1830, an uplink manager 1835, or any combination thereof. The communications manager 1820 may be an example of aspects of a communications manager 1720 as described herein. In some examples, the communications manager 1820, or various components thereof, may be configured to perform various operations (e.g., receiving, obtaining, monitoring, outputting, transmitting) using or otherwise in cooperation with the receiver 1810, the transmitter 1815, or both. For example, the communications manager 1820 may receive information from the receiver 1810, send information to the transmitter 1815, or be integrated in combination with the receiver 1810, the transmitter 1815, or both to obtain information, output information, or perform various other operations as described herein.

The communications manager 1820 may support wireless communication at a network entity in accordance with examples as disclosed herein. The time resource manager 1825 may be configured as or otherwise support a means for transmitting, to a UE, an indication of a time resource pattern including a sequence of types of a set of multiple time resources, the sequence of types including a first type of a first time resource of the set of multiple time resources, the first type indicating a split of a set of multiple frequency resources in the first time resource into a set of multiple portions of frequency resources, the set of multiple portions of frequency resources including a first portion of frequency resources allocated for downlink and a second portion of frequency resources allocated for uplink. The downlink manager 1830 may be configured as or otherwise support a means for transmitting downlink signals to the UE on the first portion of frequency resources in the first time resource. The uplink manager 1835 may be configured as or otherwise support a means for receiving uplink signals from the UE on the second portion of frequency resources in the first time resource.

Figure 19:
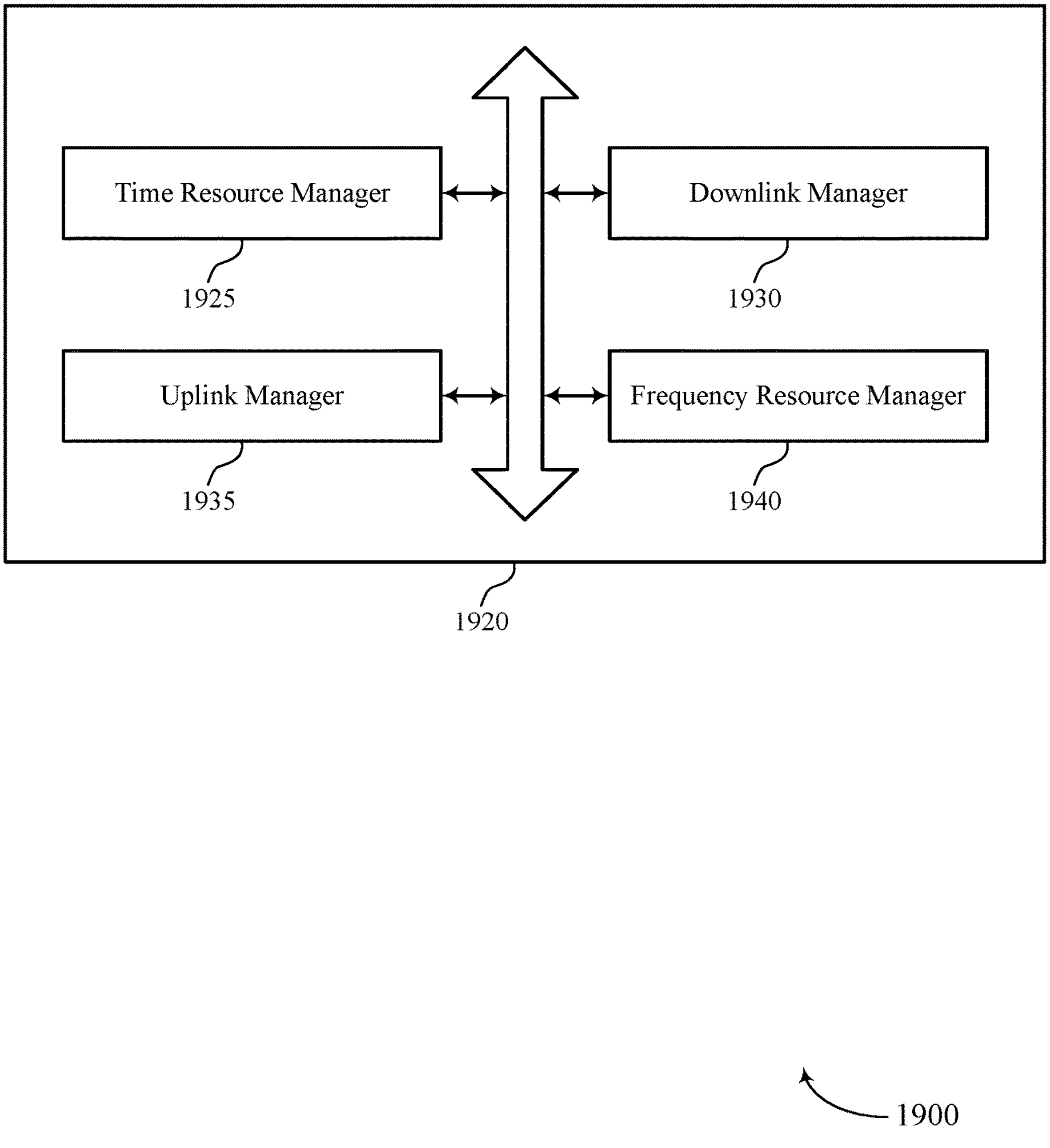
FIG. 19 shows a block diagram of a communications manager that supports joint configuration of time and frequency resources for full duplex in accordance with one or more aspects of the present disclosure.

FIG. 19 shows a block diagram 1900 of a communications manager 1920 that supports joint configuration of time and frequency resources for full duplex in accordance with one or more aspects of the present disclosure. The communications manager 1920 may be an example of aspects of a communications manager 1720, a communications manager 1820, or both, as described herein. The communications manager 1920, or various components thereof, may be an example of means for performing various aspects of joint configuration of time and frequency resources for full duplex as described herein. For example, the communications manager 1920 may include a time resource manager 1925, a downlink manager 1930, an uplink manager 1935, a frequency resource manager 1940, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1920 may support wireless communication at a network entity in accordance with examples as disclosed herein. The time resource manager 1925 may be configured as or otherwise support a means for transmitting, to a UE, an indication of a time resource pattern including a sequence of types of a set of multiple time resources, the sequence of types including a first type of a first time resource of the set of multiple time resources, the first type indicating a split of a set of multiple frequency resources in the first time resource into a set of multiple portions of frequency resources, the set of multiple portions of frequency resources including a first portion of frequency resources allocated for downlink and a second portion of frequency resources allocated for uplink. The downlink manager 1930 may be configured as or otherwise support a means for transmitting downlink signals to the UE on the first portion of frequency resources in the first time resource. The uplink manager 1935 may be configured as or otherwise support a means for receiving uplink signals from the UE on the second portion of frequency resources in the first time resource.

In some examples, the time resource manager 1925 may be configured as or otherwise support a means for transmitting an indication of a configuration for the first type of the first time resource, the configuration for the first type including an identifier of the first type, the split of frequency resources in the first time resource, and an indication of frequency resources in each portion of the set of multiple portions of frequency resources in the first time resource.

In some examples, the frequency resource manager 1940 may be configured as or otherwise support a means for transmitting an indication of a first range of frequency resources in the first portion of frequency resources and a second range of frequency resources in the second portion of frequency resources, where a guard band separating the first portion of frequency resources from the second portion of frequency resources is identified based on the first range of frequency resources in the first portion of frequency resources and the second range of frequency resources in the second portion of frequency resources.

In some examples, the frequency resource manager 1940 may be configured as or otherwise support a means for transmitting, for each of the first range of frequency resources and the second range of frequency resources, a starting frequency resource and an ending frequency resource of each range, a starting frequency resource and a length of each range, an ending frequency resource of each range, or a length of each range.

In some examples, the frequency resource manager 1940 may be configured as or otherwise support a means for transmitting an indication of a first range of frequency resources in the first portion of frequency resources, a second range of frequency resources in the second portion of frequency resources, a third range of frequency resources including a first guard band adjacent to the first portion of frequency resources, and a fourth range of frequency resources including a second guard band adjacent to the second portion of frequency resources, where a third portion of frequency resources between the first guard band and the second guard band is identified based on the third range of frequency resources including the first guard band and the fourth range of frequency resources including the second guard band.

In some examples, the frequency resource manager 1940 may be configured as or otherwise support a means for transmitting, for each of the first range of frequency resources, the second range of frequency resources, the third range of frequency resources, and the fourth range of frequency resources, a starting frequency resource and an ending frequency resource of each range, a starting frequency resource and a length of each range, an ending frequency resource of each range, or a length of each range.

In some examples, the frequency resource manager 1940 may be configured as or otherwise support a means for transmitting an indication of a first range of frequency resources in the first portion of frequency resources and a second range of frequency resources including a guard band adjacent to the first portion of frequency resources, where the second portion of frequency resources is adjacent to the guard band and is identified based on the second range of frequency resources including the guard band.

In some examples, the frequency resource manager 1940 may be configured as or otherwise support a means for transmitting, for each of the first range of frequency resources and the second range of frequency resources, a starting frequency resource and an ending frequency resource of each range, a starting frequency resource and a length of each range, an ending frequency resource of each range, or a length of each range.

In some examples, to support transmitting the indication of the time resource pattern, the time resource manager 1925 may be configured as or otherwise support a means for transmitting an indication of a respective identifier of each type of the sequence of types in the time resource pattern.

In some examples, to support transmitting the indication of the time resource pattern, the time resource manager 1925 may be configured as or otherwise support a means for transmitting an indication of identifiers of distinct types of the sequence of types in the time resource pattern and a respective quantity of time resources having each of the distinct types in the set of multiple time resources.

In some examples, each type of the sequence of types in the time resource pattern is selected from one or more types, and the time resource pattern is selected from one or more time resource patterns.

In some examples, the time resource manager 1925 may be configured as or otherwise support a means for transmitting an indication of the one or more types from which each type of the sequence of types in the time resource pattern is selected, an indication of the one or more time resource patterns from which the time resource pattern is selected, or both.

In some examples, the frequency resource manager 1940 may be configured as or otherwise support a means for transmitting an indication of a first configuration of each frequency resource of the set of multiple frequency resources in the first time resource for uplink, downlink, or as a guard band, the first configuration allocating the first portion of frequency resources for downlink and the second portion of frequency resources for uplink.

In some examples, the first configuration is selected from one or more configurations of each frequency resource of the set of multiple frequency resources in the first time resource for uplink, downlink, or as a guard band.

In some examples, the frequency resource manager 1940 may be configured as or otherwise support a means for transmitting an indication of the one or more configurations of each frequency resource of the set of multiple frequency resources in the first time resource for uplink, downlink, or as a guard band.

In some examples, the time resources include slots, symbols, or a group of symbols, and the frequency resources include resource blocks, resource block groups, subbands, or a group of subcarriers.

Figure 20:
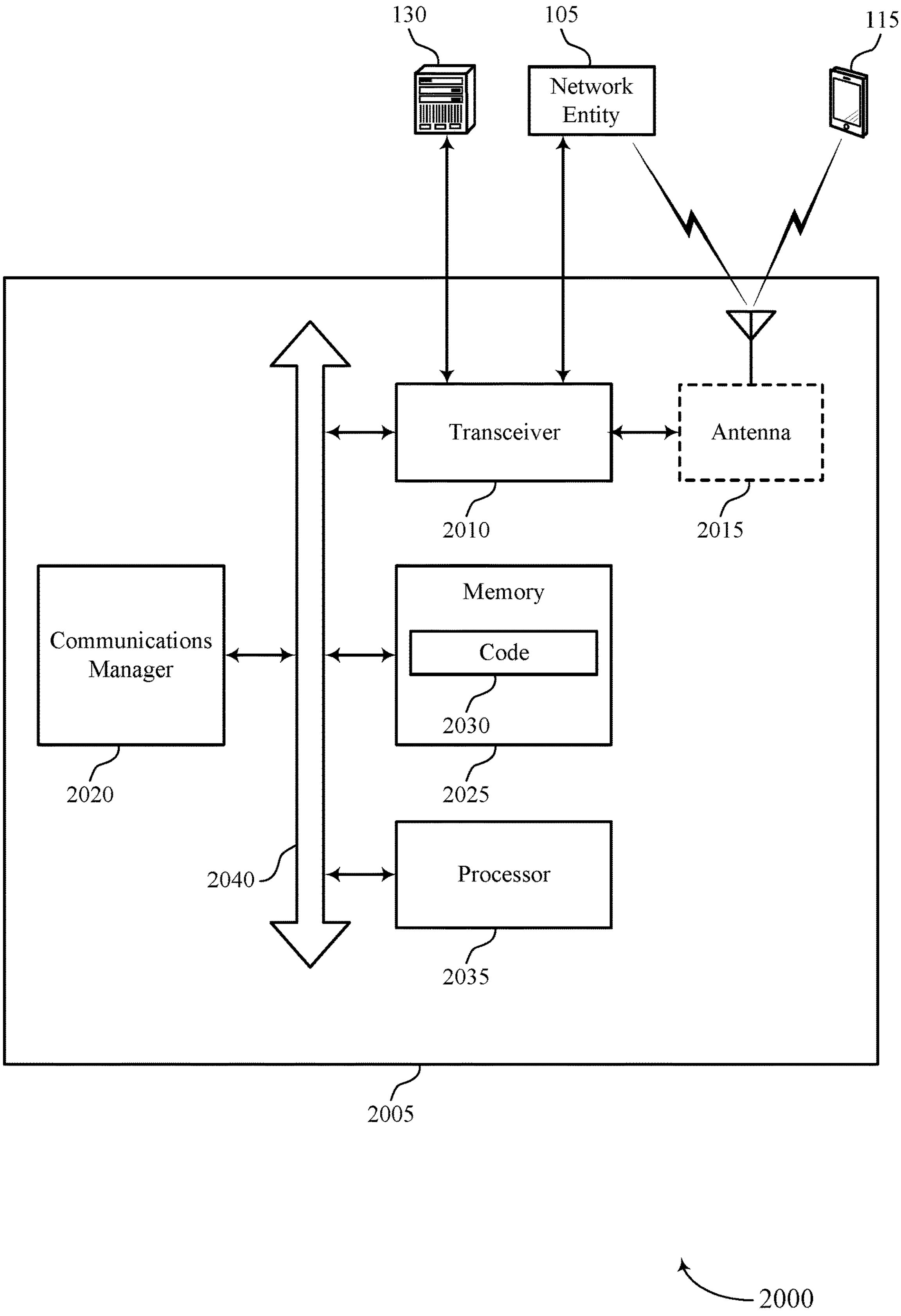
FIG. 20 shows a diagram of a system including a device that supports joint configuration of time and frequency resources for full duplex in accordance with one or more aspects of the present disclosure.

FIG. 20 shows a diagram of a system 2000 including a device 2005 that supports joint configuration of time and frequency resources for full duplex in accordance with one or more aspects of the present disclosure. The device 2005 may be an example of or include the components of a device 1705, a device 1805, or a network entity 105 as described herein. The device 2005 may communicate with one or more network entities 105, one or more UEs 115, or any combination thereof, which may include communications over one or more wired interfaces, over one or more wireless interfaces, or any combination thereof. The device 2005 may include components that support outputting and obtaining communications, such as a communications manager 2020, a transceiver 2010, an antenna 2015, a memory 2025, code 2030, and a processor 2035. These components may be in electronic communication or otherwise coupled (e.g., operatively, communicatively, functionally, electronically, electrically) via one or more buses (e.g., a bus 2040).

The transceiver 2010 may support bi-directional communications via wired links, wireless links, or both as described herein. In some examples, the transceiver 2010 may include a wired transceiver and may communicate bi-directionally with another wired transceiver. Additionally, or alternatively, in some examples, the transceiver 2010 may include a wireless transceiver and may communicate bi-directionally with another wireless transceiver. In some examples, the device 2005 may include one or more antennas 2015, which may be capable of transmitting or receiving wireless transmissions (e.g., concurrently). The transceiver 2010 may also include a modem to modulate signals, to provide the modulated signals for transmission (e.g., by one or more antennas 2015, by a wired transmitter), to receive modulated signals (e.g., from one or more antennas 2015, from a wired receiver), and to demodulate signals. In some implementations, the transceiver 2010 may include one or more interfaces, such as one or more interfaces coupled with the one or more antennas 2015 that are configured to support various receiving or obtaining operations, or one or more interfaces coupled with the one or more antennas 2015 that are configured to support various transmitting or outputting operations, or a combination thereof. In some implementations, the transceiver 2010 may include or be configured for coupling with one or more processors or memory components that are operable to perform or support operations based on received or obtained information or signals, or to generate information or other signals for transmission or other outputting, or any combination thereof. In some implementations, the transceiver 2010, or the transceiver 2010 and the one or more antennas 2015, or the transceiver 2010 and the one or more antennas 2015 and one or more processors or memory components (for example, the processor 2035, or the memory 2025, or both), may be included in a chip or chip assembly that is installed in the device 2005. In some examples, the transceiver may be operable to support communications via one or more communications links (e.g., a communication link 125, a backhaul communication link 120, a midhaul communication link 162, a fronthaul communication link 168).

The memory 2025 may include RAM and ROM. The memory 2025 may store computer-readable, computer-executable code 2030 including instructions that, when executed by the processor 2035, cause the device 2005 to perform various functions described herein. The code 2030 may be stored in a non-transitory computer-readable medium such as system memory or another type of memory. In some cases, the code 2030 may not be directly executable by the processor 2035 but may cause a computer (e.g., when compiled and executed) to perform functions described herein. In some cases, the memory 2025 may contain, among other things, a BIOS which may control basic hardware or software operation such as the interaction with peripheral components or devices.

The processor 2035 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 2035 may be configured to operate a memory array using a memory controller. In some other cases, a memory controller may be integrated into the processor 2035. The processor 2035 may be configured to execute computer-readable instructions stored in a memory (e.g., the memory 2025) to cause the device 2005 to perform various functions (e.g., functions or tasks supporting joint configuration of time and frequency resources for full duplex). For example, the device 2005 or a component of the device 2005 may include a processor 2035 and memory 2025 coupled with the processor 2035, the processor 2035 and memory 2025 configured to perform various functions described herein. The processor 2035 may be an example of a cloud-computing platform (e.g., one or more physical nodes and supporting software such as operating systems, virtual machines, or container instances) that may host the functions (e.g., by executing code 2030) to perform the functions of the device 2005. The processor 2035 may be any one or more suitable processors capable of executing scripts or instructions of one or more software programs stored in the device 2005 (such as within the memory 2025). In some implementations, the processor 2035 may be a component of a processing system. A processing system may generally refer to a system or series of machines or components that receives inputs and processes the inputs to produce a set of outputs (which may be passed to other systems or components of, for example, the device 2005). For example, a processing system of the device 2005 may refer to a system including the various other components or subcomponents of the device 2005, such as the processor 2035, or the transceiver 2010, or the communications manager 2020, or other components or combinations of components of the device 2005. The processing system of the device 2005 may interface with other components of the device 2005 and may process information received from other components (such as inputs or signals) or output information to other components. For example, a chip or modem of the device 2005 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 2005 may transmit information output from the chip or modem. Additionally, or alternatively, in some implementations, the one or more interfaces may refer to an interface between the processing system of the chip or modem and a receiver, such that the device 2005 may obtain information or signal inputs, and the information may be passed to the processing system. A person having ordinary skill in the art will readily recognize that a first interface also may obtain information or signal inputs, and a second interface also may output information or signal outputs.

In some examples, a bus 2040 may support communications of (e.g., within) a protocol layer of a protocol stack. In some examples, a bus 2040 may support communications associated with a logical channel of a protocol stack (e.g., between protocol layers of a protocol stack), which may include communications performed within a component of the device 2005, or between different components of the device 2005 that may be co-located or located in different locations (e.g., where the device 2005 may refer to a system in which one or more of the communications manager 2020, the transceiver 2010, the memory 2025, the code 2030, and the processor 2035 may be located in one of the different components or divided between different components).

In some examples, the communications manager 2020 may manage aspects of communications with a core network 130 (e.g., via one or more wired or wireless backhaul links). For example, the communications manager 2020 may manage the transfer of data communications for client devices, such as one or more UEs 115. In some examples, the communications manager 2020 may manage communications with other network entities 105 and may include a controller or scheduler for controlling communications with UEs 115 in cooperation with other network entities 105. In some examples, the communications manager 2020 may support an X2 interface within an LTE/LTE-A wireless communications network technology to provide communication between network entities 105.

The communications manager 2020 may support wireless communication at a network entity in accordance with examples as disclosed herein. For example, the communications manager 2020 may be configured as or otherwise support a means for transmitting, to a UE, an indication of a time resource pattern including a sequence of types of a set of multiple time resources, the sequence of types including a first type of a first time resource of the set of multiple time resources, the first type indicating a split of a set of multiple frequency resources in the first time resource into a set of multiple portions of frequency resources, the set of multiple portions of frequency resources including a first portion of frequency resources allocated for downlink and a second portion of frequency resources allocated for uplink. The communications manager 2020 may be configured as or otherwise support a means for transmitting downlink signals to the UE on the first portion of frequency resources in the first time resource. The communications manager 2020 may be configured as or otherwise support a means for receiving uplink signals from the UE on the second portion of frequency resources in the first time resource.

By including or configuring the communications manager 2020 in accordance with examples as described herein, the device 2005 may support techniques for more efficient utilization of communication resources. In particular, using the techniques described herein, the device 2005 may be configured with time and frequency resources for full duplex communications with a network entity 105. As a result, the device 2005 may be able to maximize the use of allocated resources or more efficiently utilize communication resources (e.g., by simultaneously transmitting and receiving on the communication resources).

In some examples, the communications manager 2020 may be configured to perform various operations (e.g., receiving, obtaining, monitoring, outputting, transmitting) using or otherwise in cooperation with the transceiver 2010, the one or more antennas 2015 (e.g., where applicable), or any combination thereof. Although the communications manager 2020 is illustrated as a separate component, in some examples, one or more functions described with reference to the communications manager 2020 may be supported by or performed by the transceiver 2010, the processor 2035, the memory 2025, the code 2030, or any combination thereof. For example, the code 2030 may include instructions executable by the processor 2035 to cause the device 2005 to perform various aspects of joint configuration of time and frequency resources for full duplex as described herein, or the processor 2035 and the memory 2025 may be otherwise configured to perform or support such operations.

Figure 21:
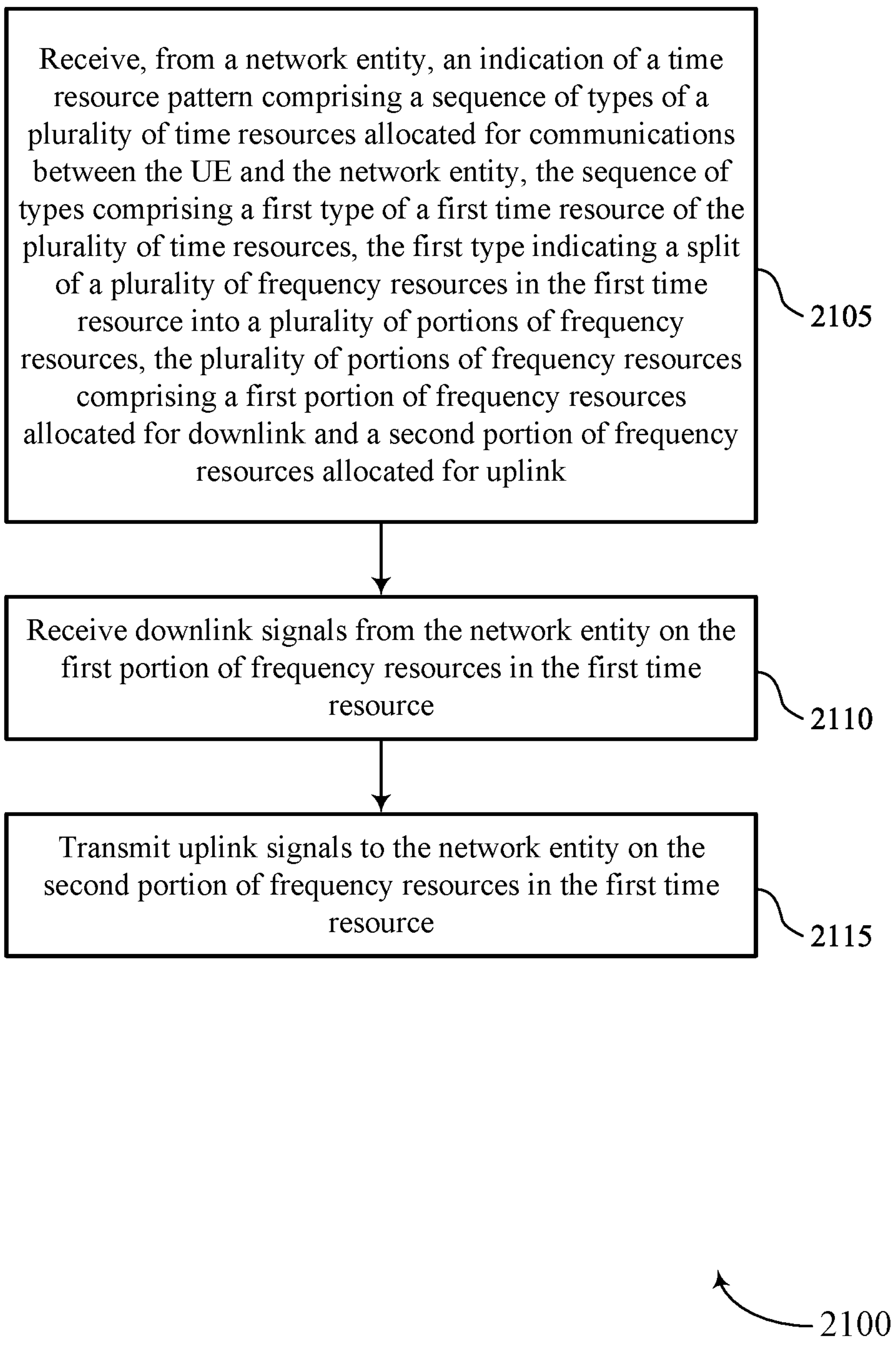
FIGS. 21 and 22 show flowcharts illustrating methods that support joint configuration of time and frequency resources for full duplex in accordance with one or more aspects of the present disclosure.

FIG. 21 shows a flowchart illustrating a method 2100 that supports joint configuration of time and frequency resources for full duplex in accordance with one or more aspects of the present disclosure. The operations of the method 2100 may be implemented by a UE or its components as described herein. For example, the operations of the method 2100 may be performed by a UE 115 as described with reference to FIGS. 1 through 16. In some examples, a UE may execute a set of instructions to control the functional elements of the UE to perform the described functions. Additionally, or alternatively, the UE may perform aspects of the described functions using special-purpose hardware.

At 2105, the method may include receiving, from a network entity, an indication of a time resource pattern including a sequence of types of a set of multiple time resources, the sequence of types including a first type of a first time resource of the set of multiple time resources, the first type indicating a split of a set of multiple frequency resources in the first time resource into a set of multiple portions of frequency resources, the set of multiple portions of frequency resources including a first portion of frequency resources allocated for downlink and a second portion of frequency resources allocated for uplink. The operations of 2105 may be performed in accordance with examples as disclosed herein. In some examples, aspects of the operations of 2105 may be performed by a time resource manager 1525 as described with reference to FIG. 15.

At 2110, the method may include receiving downlink signals from the network entity on the first portion of frequency resources in the first time resource. The operations of 2110 may be performed in accordance with examples as disclosed herein. In some examples, aspects of the operations of 2110 may be performed by a downlink manager 1530 as described with reference to FIG. 15.

At 2115, the method may include transmitting uplink signals to the network entity on the second portion of frequency resources in the first time resource. The operations of 2115 may be performed in accordance with examples as disclosed herein. In some examples, aspects of the operations of 2115 may be performed by an uplink manager 1535 as described with reference to FIG. 15.

Figure 22:
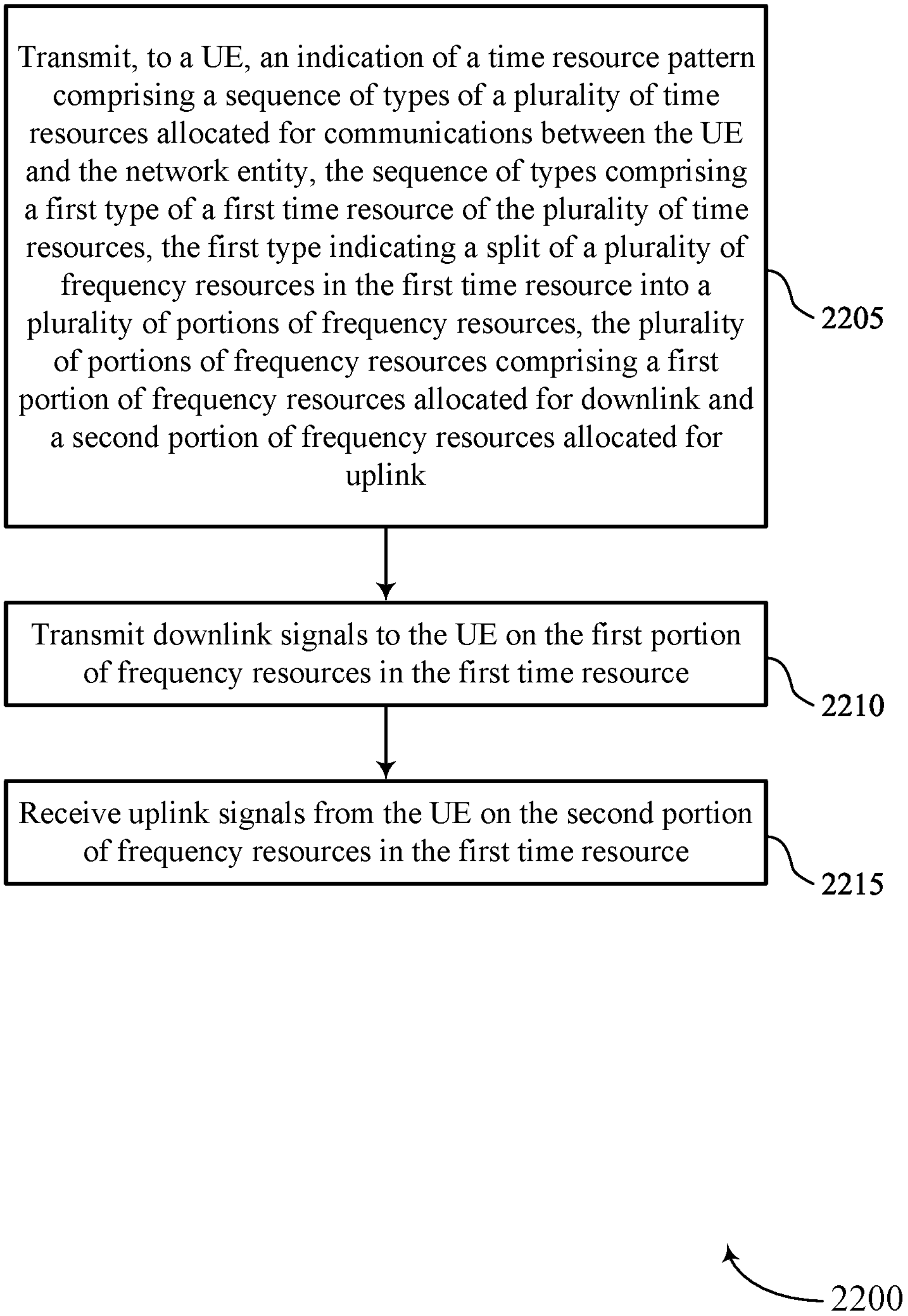

FIG. 22 shows a flowchart illustrating a method 2200 that supports joint configuration of time and frequency resources for full duplex in accordance with one or more aspects of the present disclosure. The operations of the method 2200 may be implemented by a network entity or its components as described herein. For example, the operations of the method 2200 may be performed by a network entity as described with reference to FIGS. 1 through 12 and 17 through 20. In some examples, a network entity may execute a set of instructions to control the functional elements of the network entity to perform the described functions. Additionally, or alternatively, the network entity may perform aspects of the described functions using special-purpose hardware.

At 2205, the method may include transmitting, to a UE, an indication of a time resource pattern including a sequence of types of a set of multiple time resources, the sequence of types including a first type of a first time resource of the set of multiple time resources, the first type indicating a split of a set of multiple frequency resources in the first time resource into a set of multiple portions of frequency resources, the set of multiple portions of frequency resources including a first portion of frequency resources allocated for downlink and a second portion of frequency resources allocated for uplink. The operations of 2205 may be performed in accordance with examples as disclosed herein. In some examples, aspects of the operations of 2205 may be performed by a time resource manager 1925 as described with reference to FIG. 19.

At 2210, the method may include transmitting downlink signals to the UE on the first portion of frequency resources in the first time resource. The operations of 2210 may be performed in accordance with examples as disclosed herein. In some examples, aspects of the operations of 2210 may be performed by a downlink manager 1930 as described with reference to FIG. 19.

At 2215, the method may include receiving uplink signals from the UE on the second portion of frequency resources in the first time resource. The operations of 2215 may be performed in accordance with examples as disclosed herein. In some examples, aspects of the operations of 2215 may be performed by an uplink manager 1935 as described with reference to FIG. 19.

The following provides an overview of aspects of the present disclosure:

Aspect 1: A method for wireless communication at a UE, comprising: receiving, from a network entity, an indication of a time resource pattern comprising a sequence of types of a plurality of time resources, the sequence of types comprising a first type of a first time resource of the plurality of time resources, the first type indicating a split of a plurality of frequency resources in the first time resource into a plurality of portions of frequency resources, the plurality of portions of frequency resources comprising a first portion of frequency resources allocated for downlink and a second portion of frequency resources allocated for uplink; receiving downlink signals from the network entity on the first portion of frequency resources in the first time resource; and transmitting uplink signals to the network entity on the second portion of frequency resources in the first time resource.

Aspect 2: The method of aspect 1, further comprising: receiving an indication of a configuration for the first type of the first time resource, the configuration for the first type comprising an identifier of the first type, the split of frequency resources in the first time resource, and an indication of frequency resources in each portion of the plurality of portions of frequency resources in the first time resource.

Aspect 3: The method of any of aspects 1 through 2, further comprising: receiving an indication of a first range of frequency resources in the first portion of frequency resources and a second range of frequency resources in the second portion of frequency resources, wherein a guard band separating the first portion of frequency resources from the second portion of frequency resources is identified based at least in part on the first range of frequency resources in the first portion of frequency resources and the second range of frequency resources in the second portion of frequency resources.

Aspect 4: The method of aspect 3, further comprising: receiving, for each of the first range of frequency resources and the second range of frequency resources, a starting frequency resource and an ending frequency resource of each range, a starting frequency resource and a length of each range, an ending frequency resource of each range, or a length of each range.

Aspect 5: The method of any of aspects 1 through 4, further comprising: receiving an indication of a first range of frequency resources in the first portion of frequency resources, a second range of frequency resources in the second portion of frequency resources, a third range of frequency resources comprising a first guard band adjacent to the first portion of frequency resources, and a fourth range of frequency resources comprising a second guard band adjacent to the second portion of frequency resources, wherein a third portion of frequency resources between the first guard band and the second guard band is identified based at least in part on the third range of frequency resources comprising the first guard band and the fourth range of frequency resources comprising the second guard band.

Aspect 6: The method of aspect 5, further comprising: receiving, for each of the first range of frequency resources, the second range of frequency resources, the third range of frequency resources, and the fourth range of frequency resources, a starting frequency resource and an ending frequency resource of each range, a starting frequency resource and a length of each range, an ending frequency resource of each range, or a length of each range.

Aspect 7: The method of any of aspects 1 through 6, further comprising: receiving an indication of a first range of frequency resources in the first portion of frequency resources and a second range of frequency resources comprising a guard band adjacent to the first portion of frequency resources, wherein the second portion of frequency resources is adjacent to the guard band and is identified based at least in part on the second range of frequency resources comprising the guard band.

Aspect 8: The method of aspect 7, further comprising: receiving, for each of the first range of frequency resources and the second range of frequency resources, a starting frequency resource and an ending frequency resource of each range, a starting frequency resource and a length of each range, an ending frequency resource of each range, or a length of each range.

Aspect 9: The method of any of aspects 1 through 8, wherein receiving the indication of the time resource pattern comprises: receiving an indication of a respective identifier of each type of the sequence of types in the time resource pattern.

Aspect 10: The method of any of aspects 1 through 9, wherein receiving the indication of the time resource pattern comprises: receiving an indication of identifiers of distinct types of the sequence of types in the time resource pattern and a respective quantity of time resources having each of the distinct types in the plurality of time resources.

Aspect 11: The method of any of aspects 1 through 10, wherein each type of the sequence of types in the time resource pattern is selected from one or more types, and the time resource pattern is selected from one or more time resource patterns.

Aspect 12: The method of aspect 11, further comprising: receiving an indication of the one or more types from which each type of the sequence of types in the time resource pattern is selected, an indication of the one or more time resource patterns from which the time resource pattern is selected, or both.

Aspect 13: The method of any of aspects 1 through 12, further comprising: receiving an indication of a first configuration of each frequency resource of the plurality of frequency resources in the first time resource for uplink, downlink, or as a guard band, the first configuration allocating the first portion of frequency resources for downlink and the second portion of frequency resources for uplink.

Aspect 14: The method of aspect 13, wherein the first configuration is selected from one or more configurations of each frequency resource of the plurality of frequency resources in the first time resource for uplink, downlink, or as a guard band.

Aspect 15: The method of aspect 14, further comprising: receiving an indication of the one or more configurations of each frequency resource of the plurality of frequency resources in the first time resource for uplink, downlink, or as a guard band.

Aspect 16: The method of any of aspects 1 through 15, wherein the time resources comprise slots, symbols, or a group of symbols, and the frequency resources comprise resource blocks, resource block groups, subbands, or a group of subcarriers.

Aspect 17: A method for wireless communication at a network entity, comprising: transmitting, to a UE, an indication of a time resource pattern comprising a sequence of types of a plurality of time resources, the sequence of types comprising a first type of a first time resource of the plurality of time resources, the first type indicating a split of a plurality of frequency resources in the first time resource into a plurality of portions of frequency resources, the plurality of portions of frequency resources comprising a first portion of frequency resources allocated for downlink and a second portion of frequency resources allocated for uplink; transmitting downlink signals to the UE on the first portion of frequency resources in the first time resource; and receiving uplink signals from the UE on the second portion of frequency resources in the first time resource.

Aspect 18: The method of aspect 17, further comprising: transmitting an indication of a configuration for the first type of the first time resource, the configuration for the first type comprising an identifier of the first type, the split of frequency resources in the first time resource, and an indication of frequency resources in each portion of the plurality of portions of frequency resources in the first time resource.

Aspect 19: The method of any of aspects 17 through 18, further comprising: transmitting an indication of a first range of frequency resources in the first portion of frequency resources and a second range of frequency resources in the second portion of frequency resources, wherein a guard band separating the first portion of frequency resources from the second portion of frequency resources is identified based at least in part on the first range of frequency resources in the first portion of frequency resources and the second range of frequency resources in the second portion of frequency resources.

Aspect 20: The method of aspect 19, further comprising: transmitting, for each of the first range of frequency resources and the second range of frequency resources, a starting frequency resource and an ending frequency resource of each range, a starting frequency resource and a length of each range, an ending frequency resource of each range, or a length of each range.

Aspect 21: The method of any of aspects 17 through 20, further comprising: transmitting an indication of a first range of frequency resources in the first portion of frequency resources, a second range of frequency resources in the second portion of frequency resources, a third range of frequency resources comprising a first guard band adjacent to the first portion of frequency resources, and a fourth range of frequency resources comprising a second guard band adjacent to the second portion of frequency resources, wherein a third portion of frequency resources between the first guard band and the second guard band is identified based at least in part on the third range of frequency resources comprising the first guard band and the fourth range of frequency resources comprising the second guard band.

Aspect 22: The method of aspect 21, further comprising: transmitting, for each of the first range of frequency resources, the second range of frequency resources, the third range of frequency resources, and the fourth range of frequency resources, a starting frequency resource and an ending frequency resource of each range, a starting frequency resource and a length of each range, an ending frequency resource of each range, or a length of each range.

Aspect 23: The method of any of aspects 17 through 22, further comprising: transmitting an indication of a first range of frequency resources in the first portion of frequency resources and a second range of frequency resources comprising a guard band adjacent to the first portion of frequency resources, wherein the second portion of frequency resources is adjacent to the guard band and is identified based at least in part on the second range of frequency resources comprising the guard band.

Aspect 24: The method of aspect 23, further comprising: transmitting, for each of the first range of frequency resources and the second range of frequency resources, a starting frequency resource and an ending frequency resource of each range, a starting frequency resource and a length of each range, an ending frequency resource of each range, or a length of each range.

Aspect 25: The method of any of aspects 17 through 24, wherein transmitting the indication of the time resource pattern comprises: transmitting an indication of a respective identifier of each type of the sequence of types in the time resource pattern.

Aspect 26: The method of any of aspects 17 through 25, wherein transmitting the indication of the time resource pattern comprises: transmitting an indication of identifiers of distinct types of the sequence of types in the time resource pattern and a respective quantity of time resources having each of the distinct types in the plurality of time resources.

Aspect 27: The method of any of aspects 17 through 26, wherein each type of the sequence of types in the time resource pattern is selected from one or more types, and the time resource pattern is selected from one or more time resource patterns.

Aspect 28: The method of aspect 27, further comprising: transmitting an indication of the one or more types from which each type of the sequence of types in the time resource pattern is selected, an indication of the one or more time resource patterns from which the time resource pattern is selected, or both.

Aspect 29: The method of any of aspects 17 through 28, further comprising: transmitting an indication of a first configuration of each frequency resource of the plurality of frequency resources in the first time resource for uplink, downlink, or as a guard band, the first configuration allocating the first portion of frequency resources for downlink and the second portion of frequency resources for uplink.

Aspect 30: The method of aspect 29, wherein the first configuration is selected from one or more configurations of each frequency resource of the plurality of frequency resources in the first time resource for uplink, downlink, or as a guard band.

Aspect 31: The method of aspect 30, further comprising: transmitting an indication of the one or more configurations of each frequency resource of the plurality of frequency resources in the first time resource for uplink, downlink, or as a guard band.

Aspect 32: The method of any of aspects 17 through 31, wherein the time resources comprise slots, symbols, or a group of symbols, and the frequency resources comprise resource blocks, resource block groups, subbands, or a group of subcarriers.

Aspect 33: An apparatus for wireless communication at a UE, comprising a processor; memory coupled with the processor; and instructions stored in the memory and executable by the processor to cause the apparatus to perform a method of any of aspects 1 through 16.

Aspect 34: An apparatus for wireless communication at a UE, comprising at least one means for performing a method of any of aspects 1 through 16.

Aspect 35: A non-transitory computer-readable medium storing code for wireless communication at a UE, the code comprising instructions executable by a processor to perform a method of any of aspects 1 through 16.

Aspect 36: An apparatus for wireless communication at a network entity, comprising a processor; memory coupled with the processor; and instructions stored in the memory and executable by the processor to cause the apparatus to perform a method of any of aspects 17 through 32.

Aspect 37: An apparatus for wireless communication at a network entity, comprising at least one means for performing a method of any of aspects 17 through 32.

Aspect 38: A non-transitory computer-readable medium storing code for wireless communication at a network entity, the code comprising instructions executable by a processor to perform a method of any of aspects 17 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:

at least one processor;

at least one memory coupled with the at least one processor; and instructions stored in the at least one memory and executable by the at least one processor to cause the apparatus to:

receive, from a network entity, an indication of a time resource pattern comprising a sequence of types of a plurality of time resources, the sequence of types comprising a first type of a first time resource of the plurality of time resources, the first type indicating a split of a plurality of frequency resources in the first time resource into a plurality of portions of frequency resources, the plurality of portions of frequency resources comprising a first portion of frequency resources allocated for downlink and a second portion of frequency resources allocated for uplink;

receive an indication of a configuration for the first type of the first time resource, the configuration for the first type comprising an identifier for the first type, the split of frequency resources in the first time resource, and an indication of frequency resources in each portion of the plurality of portions of frequency resources in the first time resource;

receive downlink signals from the network entity on the first portion of frequency resources in the first time resource; and transmit uplink signals to the network entity on the second portion of frequency resources in the first time resource.

2. The apparatus of claim 1, wherein the instructions are further executable by the at least one processor to cause the apparatus to:

receive an indication of a first range of frequency resources in the first portion of frequency resources and a second range of frequency resources in the second portion of frequency resources, wherein a guard band separating the first portion of frequency resources from the second portion of frequency resources is identified based at least in part on the first range of frequency resources in the first portion of frequency resources and the second range of frequency resources in the second portion of frequency resources.

3. The apparatus of claim 2, wherein the instructions are further executable by the at least one processor to cause the apparatus to:

receive, for each of the first range of frequency resources and the second range of frequency resources, a starting frequency resource and an ending frequency resource of each range, a starting frequency resource and a length of each range, an ending frequency resource of each range, or a length of each range.

4. The apparatus of claim 1, wherein the instructions are further executable by the at least one processor to cause the apparatus to:

receive an indication of a first range of frequency resources in the first portion of frequency resources, a second range of frequency resources in the second portion of frequency resources, a third range of frequency resources comprising a first guard band adjacent to the first portion of frequency resources, and a fourth range of frequency resources comprising a second guard band adjacent to the second portion of frequency resources, wherein a third portion of frequency resources between the first guard band and the second guard band is identified based at least in part on the third range of frequency resources comprising the first guard band and the fourth range of frequency resources comprising the second guard band.

5. The apparatus of claim 4, wherein the instructions are further executable by the at least one processor to cause the apparatus to:

receive, for each of the first range of frequency resources, the second range of frequency resources, the third range of frequency resources, and the fourth range of frequency resources, a starting frequency resource and an ending frequency resource of each range, a starting frequency resource and a length of each range, an ending frequency resource of each range, or a length of each range.

6. The apparatus of claim 1, wherein the instructions are further executable by the at least one processor to cause the apparatus to:

receive an indication of a first range of frequency resources in the first portion of frequency resources and a second range of frequency resources comprising a guard band adjacent to the first portion of frequency resources, wherein the second portion of frequency resources is adjacent to the guard band and is identified based at least in part on the second range of frequency resources comprising the guard band.

7. The apparatus of claim 6, wherein the instructions are further executable by the at least one processor to cause the apparatus to:

receive, for each of the first range of frequency resources and the second range of frequency resources, a starting frequency resource and an ending frequency resource of each range, a starting frequency resource and a length of each range, an ending frequency resource of each range, or a length of each range.

8. The apparatus of claim 1, wherein the instructions to receive the indication of the time resource pattern are executable by the at least one processor to cause the apparatus to:

receive an indication of a respective identifier of each type of the sequence of types in the time resource pattern.

9. The apparatus of claim 1, wherein the instructions to receive the indication of the time resource pattern are executable by the at least one processor to cause the apparatus to:

receive an indication of identifiers of distinct types of the sequence of types in the time resource pattern and a respective quantity of time resources having each of the distinct types in the plurality of time resources.

10. The apparatus of claim 1, wherein each type of the sequence of types in the time resource pattern is selected from one or more types, and the time resource pattern is selected from one or more time resource patterns.

11. The apparatus of claim 10, wherein the instructions are further executable by the at least one processor to cause the apparatus to:

receive an indication of the one or more types from which each type of the sequence of types in the time resource pattern is selected, an indication of the one or more time resource patterns from which the time resource pattern is selected, or both.

12. The apparatus of claim 1, wherein the instructions are further executable by the at least one processor to cause the apparatus to:

receive an indication of a first configuration of each frequency resource of the plurality of frequency resources in the first time resource for uplink, downlink, or as a guard band, the first configuration allocating the first portion of frequency resources for downlink and the second portion of frequency resources for uplink.

13. The apparatus of claim 12, wherein the first configuration is selected from one or more configurations of each frequency resource of the plurality of frequency resources in the first time resource for uplink, downlink, or as a guard band.

14. An apparatus for wireless communication at a network entity, comprising:

at least one processor;

at least one memory coupled with the at least one processor; and instructions stored in the at least one memory and executable by the at least one processor to cause the apparatus to:

transmit, to a user equipment (UE), an indication of a time resource pattern comprising a sequence of types of a plurality of time resources, the sequence of types comprising a first type of a first time resource of the plurality of time resources, the first type indicating a split of a plurality of frequency resources in the first time resource into a plurality of portions of frequency resources, the plurality of portions of frequency resources comprising a first portion of frequency resources allocated for downlink and a second portion of frequency resources allocated for uplink;

transmit an indication of a configuration for the first type of the first time resource, the configuration for the first type comprising an identifier of the first type, the split of frequency resources in the first time resource, and an indication of frequency resources in each portion of the plurality of portions of frequency resources in the first time resource;

transmit downlink signals to the UE on the first portion of frequency resources in the first time resource; and receive uplink signals from the UE on the second portion of frequency resources in the first time resource.

15. The apparatus of claim 14, wherein the instructions are further executable by the at least one processor to cause the apparatus to:

transmit an indication of a first range of frequency resources in the first portion of frequency resources and a second range of frequency resources in the second portion of frequency resources, wherein a guard band separating the first portion of frequency resources from the second portion of frequency resources is identified based at least in part on the first range of frequency resources in the first portion of frequency resources and the second range of frequency resources in the second portion of frequency resources.

16. The apparatus of claim 15, wherein the instructions are further executable by the at least one processor to cause the apparatus to:

transmit, for each of the first range of frequency resources and the second range of frequency resources, a starting frequency resource and an ending frequency resource of each range, a starting frequency resource and a length of each range, an ending frequency resource of each range, or a length of each range.

17. The apparatus of claim 14, wherein the instructions are further executable by the at least one processor to cause the apparatus to:

transmit an indication of a first range of frequency resources in the first portion of frequency resources, a second range of frequency resources in the second portion of frequency resources, a third range of frequency resources comprising a first guard band adjacent to the first portion of frequency resources, and a fourth range of frequency resources comprising a second guard band adjacent to the second portion of frequency resources, wherein a third portion of frequency resources between the first guard band and the second guard band is identified based at least in part on the third range of frequency resources comprising the first guard band and the fourth range of frequency resources comprising the second guard band.

18. The apparatus of claim 17, wherein the instructions are further executable by the at least one processor to cause the apparatus to:

transmit, for each of the first range of frequency resources, the second range of frequency resources, the third range of frequency resources, and the fourth range of frequency resources, a starting frequency resource and an ending frequency resource of each range, a starting frequency resource and a length of each range, an ending frequency resource of each range, or a length of each range.

19. The apparatus of claim 14, wherein the instructions are further executable by the at least one processor to cause the apparatus to:

transmit an indication of a first range of frequency resources in the first portion of frequency resources and a second range of frequency resources comprising a guard band adjacent to the first portion of frequency resources, wherein the second portion of frequency resources is adjacent to the guard band and is identified based at least in part on the second range of frequency resources comprising the guard band.

20. The apparatus of claim 19, wherein the instructions are further executable by the at least one processor to cause the apparatus to:

transmit, for each of the first range of frequency resources and the second range of frequency resources, a starting frequency resource and an ending frequency resource of each range, a starting frequency resource and a length of each range, an ending frequency resource of each range, or a length of each range.

21. The apparatus of claim 14, wherein the instructions to transmit the indication of the time resource pattern are executable by the at least one processor to cause the apparatus to:

transmit an indication of a respective identifier of each type of the sequence of types in the time resource pattern.

22. The apparatus of claim 14, wherein the instructions to transmit the indication of the time resource pattern are executable by the at least one processor to cause the apparatus to:

transmit an indication of identifiers of distinct types of the sequence of types in the time resource pattern and a respective quantity of time resources having each of the distinct types in the plurality of time resources.

23. The apparatus of claim 14, wherein each type of the sequence of types in the time resource pattern is selected from one or more types, and the time resource pattern is selected from one or more time resource patterns.

24. The apparatus of claim 23, wherein the instructions are further executable by the at least one processor to cause the apparatus to:

transmit an indication of the one or more types from which each type of the sequence of types in the time resource pattern is selected, an indication of the one or more time resource patterns from which the time resource pattern is selected, or both.

25. The apparatus of claim 14, wherein the instructions are further executable by the at least one processor to cause the apparatus to:

transmit an indication of a first configuration of each frequency resource of the plurality of frequency resources in the first time resource for uplink, downlink, or as a guard band, the first configuration allocating the first portion of frequency resources for downlink and the second portion of frequency resources for uplink.

26. The apparatus of claim 25, wherein the first configuration is selected from one or more configurations of each frequency resource of the plurality of frequency resources in the first time resource for uplink, downlink, or as a guard band.

27. A method for wireless communication at a user equipment (UE), comprising:

receiving, from a network entity, an indication of a time resource pattern comprising a sequence of types of a plurality of time resources, the sequence of types comprising a first type of a first time resource of the plurality of time resources, the first type indicating a split of a plurality of frequency resources in the first time resource into a plurality of portions of frequency resources, the plurality of portions of frequency resources comprising a first portion of frequency resources allocated for downlink and a second portion of frequency resources allocated for uplink;

receiving an indication of a configuration for the first type of the first time resource, the configuration for the first type comprising an identifier for the first type, the split of frequency resources in the first time resource, and an indication of frequency resources in each portion of the plurality of portions of frequency resources in the first time resource;

receiving downlink signals from the network entity on the first portion of frequency resources in the first time resource; and transmitting uplink signals to the network entity on the second portion of frequency resources in the first time resource.

28. A method for wireless communication at a network entity, comprising:

transmitting, to a user equipment (UE), an indication of a time resource pattern comprising a sequence of types of a plurality of time resources, the sequence of types comprising a first type of a first time resource of the plurality of time resources, the first type indicating a split of a plurality of frequency resources in the first time resource into a plurality of portions of frequency resources, the plurality of portions of frequency resources comprising a first portion of frequency resources allocated for downlink and a second portion of frequency resources allocated for uplink;

transmitting an indication of a configuration for the first type of the first time resource, the configuration for the first type comprising an identifier of the first type, the split of frequency resources in the first time resource, and an indication of frequency resources in each portion of the plurality of portions of frequency resources in the first time resource;

transmitting downlink signals to the UE on the first portion of frequency resources in the first time resource; and receiving uplink signals from the UE on the second portion of frequency resources in the first time resource.

* * * * *